US009341474B2

(12) United States Patent
Plangger et al.

(10) Patent No.: US 9,341,474 B2
(45) Date of Patent: May 17, 2016

(54) SURVEYING DEVICE HAVING A ROTATION MIRROR FOR OPTICALLY SCANNING AN ENVIRONMENT

(71) Applicant: HEXAGON TECHNOLOGY CENTER GMBH, Heerbrugg (CH)

(72) Inventors: Karl Helmut Plangger, Dornbirn (AT); Tim Mayer, Horn (CH); Jochen Scheja, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 93 days.

(21) Appl. No.: 14/511,023

(22) Filed: Oct. 9, 2014

(65) Prior Publication Data

US 2015/0096181 A1 Apr. 9, 2015

(30) Foreign Application Priority Data

Oct. 9, 2013 (EP) .................................. 13187890

(51) Int. Cl.
*G01C 15/02* (2006.01)
*G01C 15/00* (2006.01)
*G02B 7/182* (2006.01)
*G02B 26/10* (2006.01)
*G01S 7/481* (2006.01)

(52) U.S. Cl.
CPC ............. *G01C 15/002* (2013.01); *G01S 7/4817* (2013.01); *G02B 7/1821* (2013.01); *G02B 26/105* (2013.01)

(58) Field of Classification Search
CPC ..... G01C 15/00; G01C 15/002; G01C 15/004
USPC ............................................ 33/290, 291, 292
See application file for complete search history.

(56) References Cited

U.S. PATENT DOCUMENTS

| 5,533,268 A | * | 7/1996 | Keightley | ............ | G01C 15/004 |
| | | | | | 33/290 |
| 5,914,778 A | * | 6/1999 | Dong | .................... | G01C 15/004 |
| | | | | | 33/291 |

(Continued)

FOREIGN PATENT DOCUMENTS

| DE | 1 496 526 A1 | 11/1969 |
| DE | 10 2009 055 988 B3 | 3/2011 |

(Continued)

OTHER PUBLICATIONS

European Search Report dated May 22, 2014 as received in Application No. EP 13 18 7890.

*Primary Examiner* — G. Bradley Bennett
(74) *Attorney, Agent, or Firm* — Maschoff Brennan

(57) ABSTRACT

Some embodiments of the invention relate to a rotation unit for a surveying device, in particular a laser scanner for optically scanning an environment and such a surveying device. The surveying device has a rotation unit having a rotation mirror, for deflecting an emission light beam and a reception light beam, and a rotation body implemented as a cylinder having a on a beveled, free end. The rotation body is implemented as a hollow cylinder having a cylinder bottom and a beveled cylinder wall on its free end. The hollow cylinder is connected coaxially with respect to its cylinder axis in a rotationally-fixed manner to a motor-driven shaft via the cylinder bottom. The rotation mirror is fastened in the region of its free end to the cylinder wall of the hollow cylinder so it is supported thereby.

20 Claims, 10 Drawing Sheets

(56) References Cited

U.S. PATENT DOCUMENTS

| | | |
|---|---|---|
| 6,386,719 B1 | 5/2002 | Lee |
| 8,705,016 B2 | 4/2014 | Schumann et al. |
| 2003/0141466 A1* | 7/2003 | Ohtomo ............... G01C 15/002 250/559.38 |
| 2004/0135990 A1* | 7/2004 | Ohtomo ............... G01C 15/002 356/4.01 |
| 2005/0172503 A1* | 8/2005 | Kumagai ............. G01C 15/002 33/290 |
| 2008/0075325 A1* | 3/2008 | Otani ................... G01C 15/002 382/106 |
| 2013/0201487 A1* | 8/2013 | Ossig ................... G01C 15/002 356/601 |
| 2014/0196293 A1* | 7/2014 | Kodaira ............... G01C 15/002 33/227 |
| 2015/0085079 A1* | 3/2015 | Gittinger ............... G06T 3/0087 348/46 |
| 2015/0096181 A1* | 4/2015 | Plangger ............... G01S 7/4817 33/290 |
| 2015/0285615 A1* | 10/2015 | Bridges ................... G01S 17/42 356/4.01 |
| 2015/0316374 A1* | 11/2015 | Winter ................. G01C 15/006 33/293 |

FOREIGN PATENT DOCUMENTS

| | | | |
|---|---|---|---|
| DE | 10 2009 057 101 | A1 | 5/2011 |
| EP | 0 890 862 | A2 | 1/1999 |
| EP | 2 378 309 | A1 | 10/2011 |

\* cited by examiner

SURVEYING DEVICE HAVING A ROTATION MIRROR FOR OPTICALLY SCANNING AN ENVIRONMENT

FIELD OF THE INVENTION

The invention relates to a surveying device, in particular a laser scanner for optically scanning an environment and a rotation unit for such a surveying device. The surveying device has a rotation unit having a rotation mirror, for deflecting an emission light beam and a reception light beam, and a rotation body, which is implemented as a cylinder, having a beveled, free end.

Such surveying devices are used to register three-dimensional objects or surfaces. In this case, they scan such a three-dimensional structure, for example, that of a building, successively using laser pulses and then calculate from the reflection pulses received in return a corresponding three-dimensional model which describes the surface of the object.

BACKGROUND

Devices implemented as laser scanners for optically scanning an environment typically comprise a measuring head mounted on a base, which is rotatable about a base axis of rotation in relation to this base. Laser light source and light sensor for the reception of reflected laser pulses are housed in the measuring head on one side, as well as transceiver optics and an exit opening, which permits the exit or entry of the radiation from or into the housing, respectively. On the other side of the measuring head, opposite to the exit opening, the measuring head has a rotation mirror for deflecting emission light beam and reception light beam, which is rotatable about an axis of rotation standing perpendicularly to the base axis. The point of intersection of the two axes of rotation generally corresponds to the point of incidence of the emission light beam on the rotation mirror, wherein the rotation mirror is generally arranged inclined by an angle of 45° in relation to the axes of rotation. It is possible to carry out a three-dimensional scan by rotating the measuring head about the base axis of rotation and rotating the rotation mirror about the axis of rotation.

Such a device implemented as a laser scanner for optically scanning an environment is known, for example, from DE 10 2009 057 101 A1. This device also has a rotation mirror for deflecting emission light beam and reception light beam, which in this case is part of a rotation unit constructed as a hybrid structure, i.e., a multipart formation made of different materials, wherein the rotation unit has, in addition to the rotation mirror, a holder made of metal and a housing made of plastic. The holder, which dominates with respect to the mass, enables the balancing, while the housing is used as a touch safeguard. The holder has a cylindrical basic shape having a 45° surface and various recesses having material parts, for example, in the form of wings, steps, or projections, between the recesses for balancing the rotor. The rotation mirror is fixed by adhesive on the 45° surface of the holder, wherein special fastening surfaces are provided for the adhesive within the 45° surface. The housing has the form of a hollow cylinder cut off at 45°. It encloses at least the holder, but can optionally also enclose the rotation mirror at the edge.

It appears unfavorable in this type of construction that the predefined structure of the holder having the predefined balancing by the material parts does not permit any subsequent fine correction of an imbalance if, for example, during or after the installation, slight torque imbalances and/or center of gravity shifts should be displayed. The adhesive spots, which are distributed irregularly over the end side of the holder in a special manner, for fastening the rotation mirror can, during a rapid rotation, due to the occurring centrifugal forces, have a negative effect on the adhesive bond, the stress states in the mirror, and the flatness of the rotation mirror, which can result in a detachment of the mirror from the holder or fragmentation of the mirror. This type of gluing in conjunction with differing thermal expansion between rotation mirror and holder can also result in an increased risk with respect to stresses inside the rotation mirror in the event of temperature variations. If the stresses do not become excessively large and this does not result in fragmentation or detachment of the mirror, at least the flatness of the rotation mirror is still endangered in the event of corresponding stresses, which has negative effects on the deflection of the emission and reception light beams and therefore on the precision of the measurement. Dynamic balancing and stiffness of the system, which also play a large role for the measurement precision, also do not appear to be considered in this concept.

SUMMARY

Some embodiments of the present invention provide a surveying device for optically scanning an environment having a rotation mirror as part of a rotation unit and providing such a rotation unit having rotation mirror, using which at least some of the disadvantages described in the prior art are overcome.

Some embodiments of the invention provide a rotation unit for a surveying device according to the species, which is light and in which stresses in the mirror can be better avoided.

Some embodiments of the invention provide such a rotation unit, in which the flatness of the mirror is not impaired by alternating temperatures and/or rapid rotational movements.

Such a rotation unit for a surveying device, which is implemented in particular as a laser scanner for optically scanning an environment, is a rotation unit having a rotation body implemented as a cylinder having a cylinder axis and a beveled free end, in the region of which, inclined in relation to the cylinder axis, a rotation mirror is provided for deflecting an emission light beam and a reception light beam. According to the invention, the rotation body is implemented as a hollow cylinder having a cavity, wherein the cavity is delimited transversely to the axial direction by a cylinder bottom and radially by a cylinder wall protruding essentially axially from the cylinder bottom. Furthermore, the cavity is delimited on the side opposite to the cylinder bottom by the rotation mirror, which, in the region of the beveled, free end of the cylinder wall, is fastened thereon. The hollow cylinder is in turn connected in a rotationally-fixed manner to a motor-driven shaft coaxially with respect to its cylinder axis, preferably via its cylinder bottom. The rotation mirror is therefore fastened on the component, which is also connected in a rotationally-fixed manner to the driven shaft. The rotation unit according to the invention therefore does not have an actual mirror holder and does not have an actual housing. This makes the installation easier and shortens the installation time. The dimensions can be kept very compact, so that the rotation unit is very stiff and space-saving and is also very light as a result of the rotation body implemented as a hollow cylinder.

In one embodiment, the rotation mirror is fastened in its peripheral region along its circumference to the cylinder wall of the hollow cylinder. In this manner, thermal and mechanical stresses can be avoided, which typically occur in the event of gluing of the mirror on the end face on the beveled cylinder having adhesive spots on the entire rear side of the mirror surface, and which have a negative effect on the flatness of the mirror.

As described, the rotation unit is fixedly connected to a driven shaft. The shaft is driven via a motor, which is mounted in a motor housing, which is in turn mounted in the surveying device. A housing wall, which faces toward the rotation unit, of the motor housing has an exit opening for the passage of the shaft. An angle encoder is preferably also arranged on this housing wall, with the aid of which the precise angle position of the rotation unit and therefore that of the rotation mirror can be determined. In this manner, the direction of emission and/or reception light beam can also be determined. An encoder disk of the angle encoder is preferably arranged on the cylinder bottom of the rotation unit in this case, while a sensor of the angle encoder is arranged on that side of the motor housing facing toward the rotation unit. The cylinder bottom can preferably be offset slightly into the hollow cylinder in this case, so that the cylinder wall protrudes beyond the cylinder bottom in the direction toward the motor housing. In this manner, the cylinder wall of the rotation body implemented as a hollow cylinder can externally enclose and protect the encoder disk. In addition, in this manner a gap of matching size arises for the angle encoder between rotation body and motor housing, without the structural dimensions of the rotation body, the motor housing, and therefore the surveying device or the laser scanner as a whole having to be changed. This type of construction thus saves structural space and reduces the installation costs, since components such as circular disk carrier and sensor carrier can be saved. In addition, this enables the use of cylindrical sensors. The use of both optical and also capacitive sensors is also possible in this manner. A further advantage is that in this manner the bending of the shaft is measurable by means of the angle coder as an axial and radial offset, which can in turn be used for a more precise analysis of the measurement results.

Another possibility of placing the angle encoder, which registers the rotation of the rotation body, is to place the encoder disk of the angle encoder on the rear side, i.e., on that side of the motor housing opposite to that of the rotation unit. This is advantageous in particular if the shaft is mounted on both sides of the motor housing, specifically using a fixed-floating bearing concept, wherein it is generally mounted, on the side of the motor housing opposite to the rotation body, with radial play (floating bearing) or less bearing stiffness. In such a situation, the angle encoder can advantageously also be used for the purpose of measuring the movement of the shaft in the bearing play.

In contrast, if the angle encoder is arranged on the fixed bearing side of the floating-fixed bearing, the support of the angle encoder is thus more stable, of course.

The rotation body implemented as a hollow cylinder is advantageously manufactured from a light material, for example, from aluminum, an aluminum alloy, magnesium, a magnesium alloy, or plastic. It is preferably implemented in one piece with its cylinder bottom, which simplifies the manufacturing and reduces the tolerances acting in a chain.

In special embodiments, hollow cylinder and cylinder bottom can be manufactured as two separate components. This is advantageous in particular if the cylinder bottom is also used as a balance element and is then manufactured from a material having a higher specific weight than the hollow cylinder, specifically from a brass alloy, for example.

In a further special embodiment, the shaft is used as the cylinder bottom and the hollow cylinder is directly connected to the shaft either by a press fit, gluing, or a detachable connection, for example, a screw connection.

The embodiment of the rotation body as a hollow cylinder and the fastening of the rotation mirror in edge regions along its circumference, without central fastening points or fastening points distributed over a larger surface area in the middle of the mirror surface, greatly reduces the risk of shear forces acting on the mirror and stresses resulting therefrom inside the mirror and having negative effects correspondingly resulting therefrom on the flatness of the mirror. Potentially occurring stress risks, because of different coefficients of thermal expansion of the mirror (in particular made of glass) and of the supporting rotation body (in particular made of aluminum or plastic) are also avoided. Since, in contrast to the prior art, the inner region of the rotation mirror is not glued, this region is free of locally pronounced shear stresses and bending stresses between the adhesive spots and local stress peaks at the adhesive spots, which is advantageous in particular with respect to the deflection of the emission light beam occurring there. The normal stresses which typically form due to thermal deformation are dissipated or absorbed by the gluing at the edge. In addition, the risk of angle errors or fitting errors, which can result in a deviation from the ideal mirror shape and mirror position, is avoided. An influence of mirror-internal stresses on the flatness and reflection direction is consequently also avoided. The risk of shattering or detachment of the mirror at high rotational speeds—often after prior damage due to thermal stresses—is reduced by only fastening it on the periphery.

Because of the selected light-weight material for the rotation body and due to the embodiment as a hollow body, the rotation body can be designed very compactly, which results in an ideal relationship of mass and stiffness. This stiffness of the structure supporting the rotation mirror in turn has a positive effect with respect to the stresses, in particular bending stresses in the mirror and in the connection between mirror and rotation body, whereby the flatness of the mirror surface and angle stability also remain ensured at high rotational speeds.

According to one embodiment, the rotation mirror is fastened on the end side on the cylinder wall. In particular, the angle of inclination of the rotation mirror then corresponds to the angle of inclination of the beveled, free end of the cylinder wall in relation to the cylinder axis, wherein this is preferably 45°. If the end face of the cylinder wall also has this angle of inclination, the rotation mirror can simply be laid flatly on the end face and fastened.

According to another embodiment, the rotation mirror is fastened on the radial inside in the region of the free end of the cylinder wall, wherein the angle of inclination of the rotation mirror also preferably corresponds here to the angle of inclination of the beveled, free end of the cylinder wall, which is preferably 45°.

Both embodiments make correctly-fitted positioning of the rotation mirror easier, in comparison to central fastenings.

If the rotation mirror is fastened on the radial inside in the region of the free end of the cylinder wall, the cylinder wall can thus advantageously have a shoulder element on the radial inside adjacent to the free end, against which the rotation mirror can be supported in its peripheral region along its circumference. "Adjacent to the free end" is to be understood in this case to mean that the shoulder element is arranged set back by a distance into the cavity from the free end of the cylinder wall, this distance corresponding to one to three times the thickness of the rotation mirror, preferably one time the thickness. The shoulder element advantageously has an angle of inclination in relation to the cylinder axis, which corresponds to the desired angle of inclination of the rotation mirror, specifically preferably 45°. In this case, the shoulder element can protrude radially inward from the cylinder wall as a continuous collar or in the form of an interrupted collar or a plurality of individual support elements. An alignment of the rotation mirror during its installation in the rotation unit is made easier by the shoulder element.

The rotation mirror is preferably fastened in the region of the free end of the cylinder wall by an adhesive bond. However, the fastening by means of a fastening ring, by means of fastening clamps, spring elements, as explained in greater detail hereafter, or the like is also conceivable.

Depending on the properties of an adhesive used, stiffness or elasticity of the adhesive bond between the rotation mirror and the corresponding region of the hollow cylinder or its cylinder wall can be set intentionally. At the same time, an adhesive used for the bond can advantageously have a compensatory effect between cylinder wall and rotation mirror with respect to different temperature-related material expansions.

The type of the gluing, for example, a continuous gluing or multiple adhesive points, can also be selected in optimized form, as can the number and arrangement of adhesive points and the size and thickness of the individual adhesive points. The optimization can also be performed in particular with regard to the wall thickness of the cylinder wall and the dimensions and properties of the rotation mirror.

According to a further embodiment, the rotation mirror is fastened on the free end of the cylinder wall by gluing by means of multiple different adhesives having different properties. Thus, in particular in the event of rapid rotation, forces acting on the mirror of possibly differing direction and strength can advantageously be compensated for or at least reduced, in particular if the various adhesives are used in a distributed fashion over the peripheral region of the rotation mirror to be glued correspondingly to the forces along the circumference. This can include in particular a mirror-symmetric and/or point-symmetric distribution.

Because of its shaping as a beveled hollow cylinder, the hollow cylinder typically has a cylinder wall of shorter length in the region of its free end in the region of a first half, and a cylinder wall of greater length in the region of a second half opposite to the first half. It is then advantageous if the rotation mirror is fastened in the region of the first shorter half by means of a first adhesive bond, which is harder than a second adhesive bond, to the cylinder wall and is fastened in the region of the second longer half by means of a second adhesive bond, which is more elastic than the first adhesive bond. The hardness or the elasticity of the adhesive bond can be determined in this case by the selection of a corresponding adhesive, for example, a first harder adhesive and a second more elastic adhesive, and/or by the suitable selection of the adhesive gap thickness.

In this case, adhesives having hardnesses between 15 Shore A and 80 Shore D are typically used. The individual pairing of the adhesives used is directed in each case according to the material properties of the hollow cylinder used and the mirror used, in particular also according to the thermal coefficients of expansion thereof and according to the expected environmental conditions at the usage location, namely an expected temperature range in which the device is to be used, moisture, air pressure, etc. Adhesives based on an epoxy resin have proven to be particularly suitable.

In particular at high rotational speeds, a centrifugal force acts on the rotation mirror in the region of the shorter half of the supporting cylinder wall, with the tendency to detach the mirror from its supporting cylinder wall and a force oriented onto the cylinder wall acts on the longer half, with a tendency to press on the rotation mirror. A relatively harder adhesive in the region of the shorter half causes a stiff attachment of the mirror to the cylinder wall and thus prevents a deformation of the adhesive bond due to the acting centrifugal forces. The risk of detachment of the rotation mirror is thus reduced. A relatively more elastic adhesive in the region of the longer half compensates for different thermal expansions of cylinder wall and rotation mirror, whereby, in cooperation with the adhesives applied to opposing halves having different properties, the risk of stresses in the rotation mirror is reduced further.

The adhesive bond between rotation mirror and cylinder wall in the first shorter half of the cylinder wall can thus be implemented, for example, by an epoxy adhesive having a hardness of 80 Shore D—(which approximately corresponds to a modulus of elasticity of 3000 N/mm$^2$, if one uses the non-unique relationship assumed for plastics between Shore hardness and modulus of elasticity similarly for adhesives), and can be implemented in the second longer half of the cylinder wall by an epoxy adhesive having a hardness of 50 Shore A.

According to a further preferred embodiment, the adhesive bond between rotation mirror and cylinder wall is implemented by discrete adhesive points. By gluing the mirror only in discrete peripheral regions, the risk of stresses in the mirror can also be reduced in the peripheral region. In this case, it is furthermore preferable for the discrete adhesive points to be distributed mirror-symmetrically and/or point-symmetrically on the longer half and the shorter half.

The discrete adhesive points can have an arbitrary geometric shape, for example, can be implemented as circular or spot-shaped or lamellar.

According to a further embodiment, the cylinder wall has an adhesive groove or individual depressions on the radial inside or on the end side in the region of its free end for accommodating adhesive for the gluing of the rotation mirror.

In this case, the embodiment geometry of the adhesive gap, for example, its depth and width, is adapted in an optimized manner in particular to the thickness of the cylinder wall and the dimensions of the rotation mirror.

To be able to counteract detaching tendencies due to the occurring centrifugal forces still better, in the half of the shorter cylinder wall, in its shortest region, the cylinder wall can be provided with a flange protruding into the cavity of the hollow cylinder, on which, radially spaced apart from the cylinder center, one or more additional adhesive points can be provided. The flange is designed symmetrically in relation to the center of the shorter half and extends at most half of the internal radius of the cylinder into the cavity from the edge. It can be provided both for variants in which the rotation mirror is glued at the end side onto the cylinder wall, and also in variants in which the rotation mirror is glued in the free end of the hollow cylinder on the radial inside on the cylinder wall or and a shoulder of the cylinder wall protruding into the cavity. The flange is correspondingly arranged flush with the end side of the cylinder wall or set back into the cavity from the free end of the cylinder wall.

The flange is advantageously designed in one piece with the hollow cylinder, in particular if the hollow cylinder is formed as a cast part.

According to one embodiment, the rotation mirror is manufactured from mirror-coated glass, wherein it preferably has a thickness of 0.5 mm to 3 mm, in particular of 1 mm to 2 mm. Its geometry and hardness are preferably adapted to the system and the forces to be expected, and if necessary also its chemical resistance is adapted in relation to components of the adhesive provided.

According to a further embodiment, the rotation mirror is provided with a breakage protection, which can be embodied in particular in the form of a safety film or coating, which is integrated in the glass of the mirror or applied to its rear side, or in the form of a metal plate attached to the rear side of the rotation mirror having low coefficient of thermal expansion. For example, those as are known from the automobile industry for securing windshields come into consideration as the coating or safety film; for the metal plate, for example, a steel plate having a coefficient of thermal expansion of 5 ppm/K to 15 ppm/K comes into consideration. Propagation of flying splinters can be prevented in the case of damage or shattering of the rotation mirror by this breakage protection, for example.

Alternatively or additionally, a safety precaution can be provided, which holds back the rotation mirror in the region of the hollow cylinder in the event of failure of the fastening. This safety precaution comprises, for example, a safety element, which encloses the cylinder wall along its circumference on the free end thereof on the radial outside and encloses the rotation mirror on the end side, preferably in a formfitting manner. The safety element can be implemented in this case continuously or interrupted or in the form of individual elements, preferably distributed uniformly along the circumference. Such a safety precaution is suitable in particular for preventing the rotation mirror from flying off in the event of rapid rotation.

Because of the stiff embodiment according to the invention of the hollow cylinder (material selection, wall thickness, short free length of the cylinder wall) and the stiff attachment of the mirror to the stiff rotation body, the mirror thickness can be kept low, without mirror deformations occurring. This is important, since the mirror must be as planar as possible for precise measurements (μm range) and also must not tilt or slip. The weight of the mirror can advantageously be kept low by the low mirror thickness. Since the rotation body also only has a low mass because of its embodiment as a hollow cylinder and because of its light material, shaft bendings and measurement errors resulting therefrom can be minimized. In addition, in this way the energy consumption for operating the rotation unit can be kept low. Moreover, this enables a further increase of the compact type of construction with reduced weight of the surveying device according to the invention.

According to one embodiment, the rotation unit is provided with at least one balance element, which is arranged in the cavity and in particular in the region of the cylinder bottom therein. This balance element advantageously comprises material which is heavier than that from which the hollow cylinder is manufactured, i.e., a material having a greater specific weight than the material of the hollow cylinder, for example, brass. Static and dynamic balancing of the rotation unit is thus made possible, which prevents a strain of the shaft due to imbalance. In addition, in this manner, shaft bendings caused by the imbalance can be minimized and the vibrations excited by the imbalance can be avoided. Such a balance, using balance elements exchangeable with one another of different mass and/or geometry, is typically performed at the producer of the rotation unit. By using different materials for the various components of the rotation unit, for example, plastic as a lighter material for cylinder wall and cylinder bottom of the rotation body and brass as a heavier material for balance elements, the length of the rotation unit having the rotation mirror can advantageously be made comparatively short.

According to a further embodiment, one or more balance circles can also be provided as a balance element along the cylinder axis. A balance circle comprises multiple openings or threaded boreholes arranged concentrically and uniformly about the cylinder axis, into which grub screws of various sizes can be screwed as needed, or into which mass pins or modeling clay can be introduced. According to one preferred embodiment, a balance circle is provided in the cylinder wall of the hollow cylinder, preferably on its side opposite to the free end having the rotation mirror. The boreholes can be introduced in this case into the end side of the cylinder wall—i.e., so to speak between the rotation unit and the angle encoder—and then preferably extend axially, or they can be arranged along the interior or exterior circumference and then preferably extend radially. If the threaded boreholes are arranged along the outer circumference, of course, they can also be arranged at any arbitrary other location along the axial extension of the cylinder wall; of course, preferably at those locations along the axial extension at which the cylinder wall displays a complete circumference. Another possible location for a balance circle is the outer side of the cylinder bottom, which faces toward the motor housing. Still a further possibility for arranging a balance circle is along the circumference of the shaft. This can be used particularly advantageously if the shaft is guided through the motor. If the balance circle is then arranged on the end opposite to the rotation unit, outside the motor, because of the long lever, a large effect can already be achieved using balance elements of small mass. The balance circles are particularly advantageous in that they also allow subsequent fine balancing after the installation in particular. This applies for all described balance circles, but as a result of their particularly good accessibility, of course, particularly for the balance circles along the outer circumference of the hollow cylinder.

Still another, although somewhat also more complex fine balancing consists of taking material away from the cylinder wall or the cylinder bottom of the hollow cylinder instead of adding mass elements for the balancing. This can be performed most easily by applying sinkholes, wherein the material removal by a sinkhole and the placement of the sinkhole are precisely calculated beforehand.

Of course, in the placement of sinkholes (notch effect), and also in the adding of mass elements, it is ensured that the static and dynamic stability of the component always remains ensured by the material removal or the material addition.

A gap is typically provided between the rotation mirror and the free end of the cylinder wall. This gap is preferably provided with a gap seal. Penetration of dust and/or dirt and/or moisture can thus be prevented. The gap seal can comprise, for example, a sealing adhesive tape and/or a lacquer and/or a component, which is designed to enclose the edge in particular, i.e., it encloses both an edge of the cylinder wall and also a peripheral region of the rotation mirror. In particular, this edge-enclosing component can also be used as a safety precaution if it is embodied sufficiently stably, provided with a corresponding seal, and is securely fastenable on the cylinder wall.

Typically, to enable frictionless rotation of the rotation unit in relation to a motor housing for accommodating a motor for the drive of the shaft, a second gap is provided between the cylinder bottom and the motor housing, for which no gap cover is provided. To enable an air exchange between the cavity and the surroundings, according to a further embodiment, a passage opening is provided in the cylinder bottom or laterally. The passage opening is provided with an air-permeable membrane, which is impermeable to dust and moisture, however. A continuous adaptation of the air pressure in the cavity to the air pressure of the surroundings is thus enabled, which is important in the case of air pressure variations and at high rotational velocities, so that the rotation mirror does not bulge.

If it is not possible or desirable to provide the cylinder bottom with such a membrane-provided passage opening for the pressure equalization for structural reasons, instead of the gap seal, a membrane closure of the gap can also be provided between cylinder wall and rotation mirror. The membrane is attached similarly to the gap seal, but in contrast to the gap seal, it permits air to flow through the gap, while dust, moisture, and dirt are held back by the membrane and are not let into the cavity.

Instead of connecting the rotation mirror directly to the cylinder wall and gluing it to the cylinder wall, for example, it is also possible, for example, to connect the rotation mirror to the cylinder wall by means of one or more spring elements. With correspondingly stiff selected spring elements, stresses/shear forces as a result of different coefficients of thermal expansion of the rotation mirror and the cylinder wall or because of the forces acting at high rotational speeds can be absorbed by the spring elements, without the precisely-fitted seat of the rotation mirror in the rotation unit suffering under this. Stresses and shear forces in the rotation mirror which could impair its flatness can thus be dissipated efficiently via the spring element or elements.

In a first embodiment, the spring element or elements is/are embodied as spiral spring(s). The spiral spring(s) is/are fixedly connected to the cylinder wall, preferably in the region of the free end of the hollow cylinder, so that it/they extends/extend from the cylinder wall into the cavity of the cylinder and toward the rotation mirror. It/they is/are fixed by means of adhesive bond, clamp connection, or by means of connection pin in or on the cylinder wall.

In a preferred embodiment, multiple spring elements are implemented in the form of springy plate tongues. These are fixed by means of adhesive bond, screw connection, riveting, welding, or by means of clamp connection in or on the cylinder wall and extend from the circumference from the cylinder wall inward and toward the rotation mirror. They are fixedly connected at their free ends to the rotation mirror.

In still another embodiment, only one spring element is provided, which is implemented as a ring-shaped spring plate and has connection elements protruding radially outward, which are fixed in or on the cylinder wall with slight pre-tension, for example. The ring of the ring-shaped spring plate is adapted in its geometry to the ellipsoid opening of the free beveled end of the hollow cylinder and is used as a fastening surface for the rotation mirror.

In a variant thereto, a planar spring plate element is provided, which is adapted in its geometry to the ellipsoid opening of the free beveled end of the hollow cylinder, wherein the surface is used for fastening the rotation mirror. Individual connection elements protruding radially outward are advantageously again provided for the production of the fixed connection to the cylinder wall, however, a continuous connection edge would also be conceivable. The latter also applies for the above-described ring-shaped spring plate, of course.

Spring plate tongues, ring-shaped spring plate, and planar spring plate element are preferably manufactured from spring steel.

If rotation mirror and spring element(s) are connected to one another by means of adhesive bond, stresses and shear forces of this adhesive bond are also absorbed by the spring element or elements, which reduces the risk of failure of the adhesive bond and detachment of the rotation mirror.

It is very advantageous if the adhesive bond between rotation mirror and spring element(s) is implemented similarly as further described above for the direct connection between rotation mirror and cylinder wall, i.e., for example, by means of adhesive of different hardness or elasticity and/or having different adhesive gap thicknesses and/or having a corresponding distribution of adhesive points on the two halves, etc.

The spring element or elements is/are fastened in the region of the free end of the hollow cylinder in or on the cylinder wall, wherein the spring element or elements is/are fastened in or on the cylinder wall preferably distributed over the circumference of the cylinder wall, in particular uniformly distributed.

The fixation in the cylinder wall can be produced in this case by means of clamp connection (for example, clamping slot in the cylinder wall, accessible from the cavity of the hollow cylinder) or again by means of adhesive bond. In this case, the statements already made on the adhesive bond between spring element and rotation mirror advantageously apply for the adhesive bond.

In a refinement of this embodiment, the rotation mirror is drawn by means of the spring element or elements with its peripheral region toward a part of the cylinder wall, which is then used as a support surface for the rotation mirror. This part can be the beveled end wall of the cylinder wall or a shoulder protruding into the cavity which is slightly set back from the opening, as was also already further described above. The shoulder can be embodied continuously or in individual segments. To generate a corresponding traction force toward the interior of the hollow-cylindrical rotation body, the spring elements or at least parts thereof are under corresponding pre-tension when all parts are installed.

The subject of the invention is also a surveying device having a rotation unit according to the invention according to one of the abovementioned embodiments having the properties and embodiment details described therein.

The surveying device is in this case particularly a surveying device for optically surveying an environment by scanning emission of an emission measurement beam having a radiation source for generating an emission measurement beam and a detector for registering an emission measurement beam reflected on an object in the environment as a reception measurement beam. The emission measurement beam emitted into the environment and the reception measurement beam captured from the environment in this case at least partially have a shared optical path. The surveying device furthermore has a housing mounted rotatably about a base axis on a base and a rotation unit which is located in the shared optical path and is mounted rotatably about an axis of rotation in the housing, for the settable, oriented emission of the emission measurement beam into the environment and for the capture of the reception measurement beam from the environment.

In a particularly preferred embodiment, the cylinder bottom of the rotation body implemented as a hollow cylinder is connected to a shaft of the surveying device, which is driven by a motor arranged in a motor housing. A gap is provided between the motor housing and the cylinder bottom, in which an angle encoder is provided, wherein a part of the angle encoder is fixedly connected to the motor housing and another part of the angle encoder is fixedly connected to the cylinder bottom.

BRIEF DESCRIPTION OF THE DRAWINGS

The device according to the invention and the method according to the invention will be described in greater detail solely as examples on the basis of concrete exemplary embodiments schematically illustrated in the drawings, wherein further advantages of the invention will also be discussed. Identical elements are provided with identical reference signs in the figures. In the specific figures:

FIG. 4b shows, in a similar illustration to FIG. 3b, the rotation unit from FIG. 4a;

FIG. 5b shows, in a similar illustration to FIG. 3b, the rotation unit from FIG. 5a;

DETAILED DESCRIPTION

Figure 1:
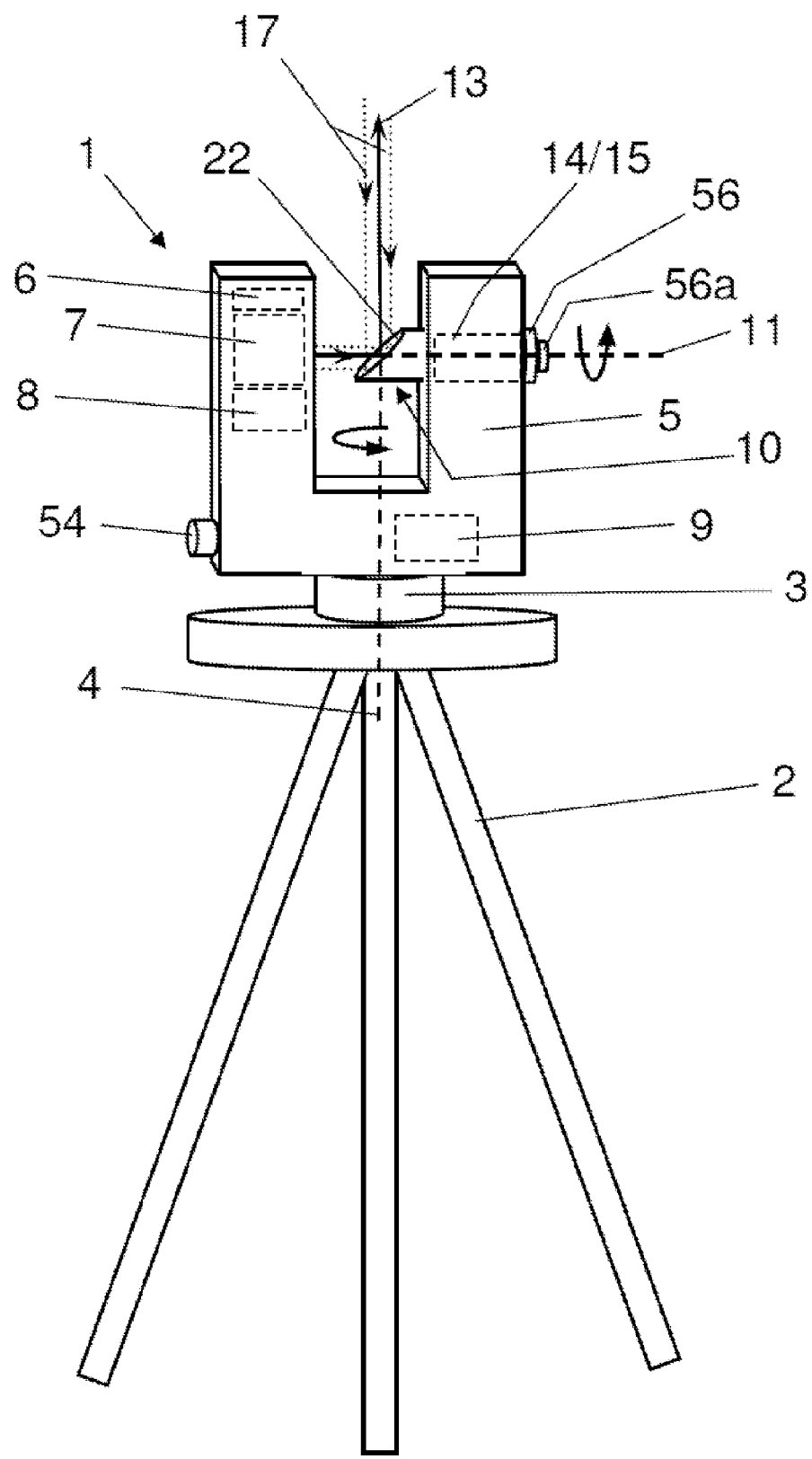
FIG. 1 shows a schematic illustration of a surveying device according to the invention implemented as a laser scanner for optically scanning the environment, installed on a tripod.

FIG. 1 shows a schematic illustration of a surveying device 1 according to the invention, implemented as a laser scanner, for optically scanning the environment of the surveying device 1. The surveying device 1 has a measuring head having a housing 5, which is mounted rotatably on a base 3 about a base axis 4. The base 3 is in turn installed on a stand 2, which is implemented here as a tripod.

The surveying device 1 has a cylindrical rotation unit 10 having a rotation mirror 22, which is driven to rotate about its cylinder axis 11 by a motor 15 arranged in a motor housing 14, as indicated in FIG. 1 by dashed lines. As also schematically indicated in FIG. 1 by dashed lines, a light source 6 for generating an emission light beam 13 is arranged in a part of the housing 5 opposite to the rotation unit 10, which is implemented in particular as a laser light source 6 and which light source can emit a modulated, in particular pulsed laser beam. Furthermore, a photosensitive detector 8 for receiving and detecting reception light beams 17, which are reflected from the environment to be optically scanned, and also optical components 7 for the deflection and shaping of the emission and reception light beams 13, 17 are provided in this housing part. The reception signal is then analyzed, for example, by a distance and/or amplitude measuring unit. In addition, a control unit 9 is provided for the surveying device 1 in the housing 5, also indicated by dashed lines, which, during a scanning operation, coordinates the rotation of the rotation unit 10 about the cylinder axis 11 and the rotation of the housing 5 about the base axis 4.

In the operating state of the surveying device 1, an emission light beam 13, which is generated by the light source 6 and is generally pulsed, is collimated by the optical components 7 and guided onto the rotation mirror 22, deflected thereon, and emitted into the environment. Reception light beams 17, which are reflected from an object in the environment or otherwise scattered, are collected again by the rotation mirror 22, deflected, and bundled by the optical components and relayed onto the photosensitive detector 8. The direction of the emission light beam 13 into the environment and the angle of incidence for reception light beams 17 on the rotation mirror result from the angle positions of the rotation unit 10 in relation to the cylinder axis 11 and the base axis 4, which are dependent on the positions of their respective rotational drives. These positions are registered by assigned encoders (not shown).

By means of the (rapid) rotation of the rotation mirror about the cylinder axis 11, for example, at a rotational velocity between 50 Hz and 250 Hz, the environment is optically scanned along a circular line in a vertical plane. By means of a rotation (slow in comparison thereto) about the base axis 4, the entire space is successively scanned using the circular lines. From the entirety of the measurement points of such a measurement, a full scan of the space surrounding the device results. Depending on the type of the analysis, for example, a 3D point cloud can result from the scan or, in the case of simultaneous detection of the received light intensities, for example, a photograph-like representation of the scanned environment can result.

Figure 2:
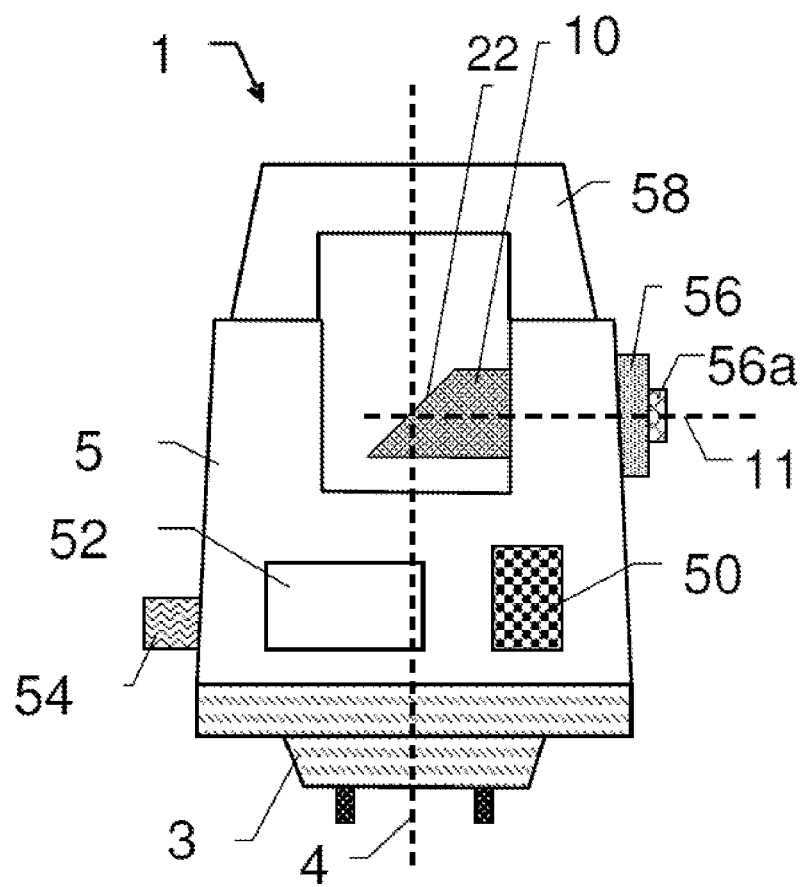
FIG. 2 schematically shows a first embodiment of a surveying device according to the invention in detail.

FIG. 2 shows an example of a possible embodiment of the surveying device 1 according to the invention in detail.

The surveying device 1 in turn has housing 5 and a base 3, which defines a base axis 4. The housing 5 having the components located therein is rotatable in relation to the base 3 about the base axis 4. For a first alignment of the measuring device on a target object, the rotation about the base axis 4 can be performed manually by means of an adjustment rotary knob 54, which acts on an adjustment mechanism (not shown), or by means of a corresponding motorization (not shown), which interacts with the adjustment mechanism. Optionally, alternatively or additionally to the alignment of the housing 5 by means of the adjustment rotary knob 54 or by motor drive, the housing 5 can be manually aligned coarsely by rotating the entire housing 5.

In a similar manner, for the alignment on a target object, the rotation unit 10 having the rotation mirror 22 as the beam deflection means can be pivoted by means of a second adjustment rotary knob 56 manually about the cylinder axis 11. The adjustment rotary knob 56 interacts in this case with a coarse drive, wherein additional motors for a controlled motorized rotation of the rotation unit 10 are also provided here. Furthermore, a high-precision manual alignment of the rotation unit 10 can be performed by means of a further fine adjustment rotary knob 56a or control button, which is connected to a fine adjustment mechanism. Upon actuation of the rotary knob 56a, the rotation unit 10 is also rotated at a specific rotational transmission ratio. By means of an electronic encoder, the transmission ratio can also be designed adaptively, for example, in that a rotational movement occurs more slowly the greater the rotational transmission ratio. By way of the alignment ability of the rotation unit 10 thus provided, a measurement laser beam can be aligned on a target in a manner which is controlled both manually and also automatically (by means of the motors connected to the respective drive shafts).

Furthermore, the surveying device 1 has a handle 58, for example, which is modularly detachable from the device 1. With removed handle 58, for example, an enlarged scanning range can be registered in the scope of a scanning operation, wherein a range can then additionally be registered which was previously shielded by the handle 58.

Figure 3A:
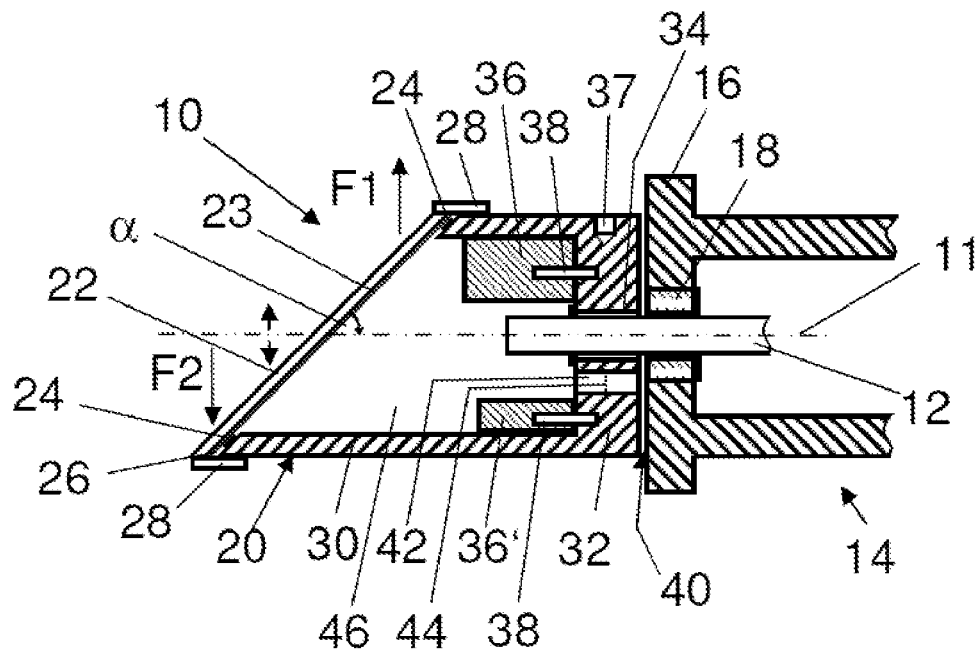
FIG. 3a schematically shows, in section along its cylinder axis, a detailed view of a first embodiment of a rotation unit according to the invention, which is associated with the surveying device according to the invention, having rotation body and rotation mirror.
Figure 3B:
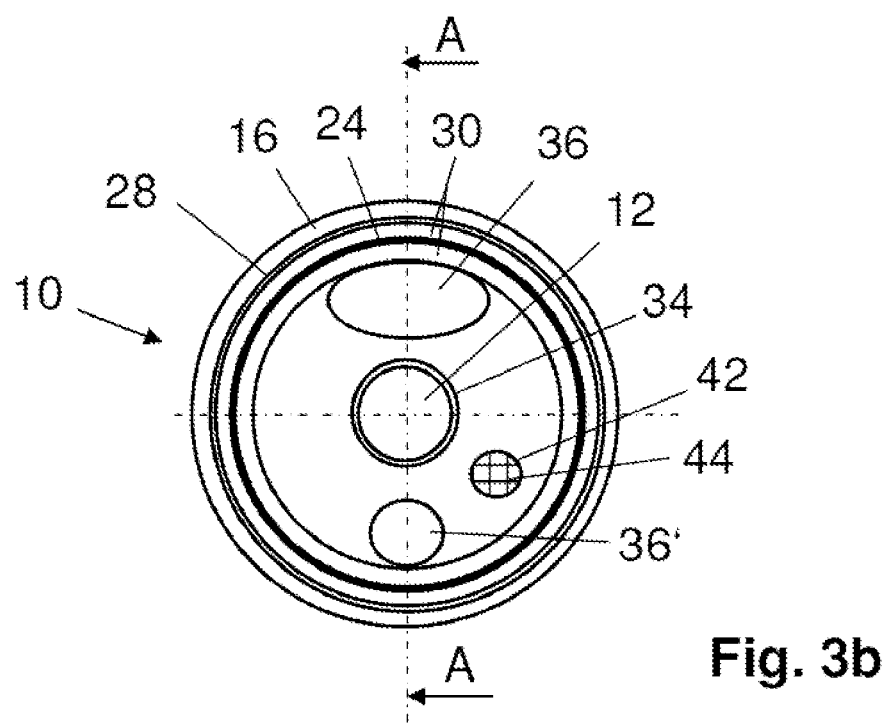
FIG. 3b schematically shows the rotation unit from FIG. 3a in the view of the end side of a free end of the rotation body without the rotation mirror.

FIGS. 3a, 3b show a first embodiment of the rotation unit 10 of the surveying device 1 according to the invention and an adjoining motor housing 14. FIG. 3a shows a detailed longitudinal sectional view along the cylinder axis 11 and FIG. 3b shows the same rotation unit 10 in a frontal view of the rotation body without the rotation mirror.

The rotation unit 10 having the rotation mirror 22 has a rotation body, which is implemented as tubular or cylindrical, in the form of a hollow cylinder 20, having a cylinder axis 11 and a cavity 46, which is radially delimited by a tube wall or cylinder wall 30 and in the axial direction by a tube or cylinder bottom 32 (right in FIG. 3a), and by the rotation mirror 22 in the region of a free end of the cylinder wall opposite to the cylinder bottom 32 (left in FIG. 3a). This rotation mirror is fixedly connected to the end faces of the cylinder wall 30 by means of adhesive bond 24. The wall thickness of the hollow cylinder is selected such that it provides the hollow cylinder with a defined stiffness on its free end. The stiffness or wall thickness is adapted in this case to the maximum rotational speed such that the deformations on the free end generated at this rotational speed by centrifugal forces remain delimited in a range in which the specified angle or direction accuracies can be maintained. The tube wall or cylinder wall 30 is beveled on its free end at an angle α in relation to the cylinder axis 11 such that the end faces of the cylinder wall 30 also have an angle of inclination α, so that the rotation mirror 22 can simply be laid flatly on its end side and fixedly glued. The rotation mirror is designed in its geometry so that—laid exactly on the end-side cylinder wall—it terminates flush with the outer side thereof. The angle of inclination α of cylinder wall 30 and rotation mirror 22 is typically 45° in relation to the cylinder axis 11.

The rotation mirror 22 is only fastened on its end side on the cylinder wall 20 or supported thereby; the rotation unit 10 does not have any additional mirror carrier. The rotation mirror 22 is preferably manufactured from glass and only has a low thickness of 0.5 mm to 5 mm, in particular 1 mm to 3 mm.

To increase the operational safety, a breakage protection 23 can be provided for the mirror 22, which in the example shown here comprises a coating or safety film 23 applied to the rear side of the rotation mirror 22. In this way, in case of damage or shattering of the rotation mirror 22 during operation, splinters can be prevented from flying around. This is very advantageous in particular at high rotational speed greater than 100 Hz.

Depending on how the rotation mirror 22 is fastened on the cylinder wall, a gap 26 which is more or less permeable to dust and moisture is located between the rotation mirror 22 and the cylinder wall 30 supporting it. As shown in FIGS. 3a, 3b, this gap 26 is advantageously sealed using a gap seal 28. Penetration of dust and/or dirt and/or moisture can thus be prevented. The gap seal 28 is preferably applied externally and encloses the edge of the cylinder wall 30 and the peripheral edge of the mirror 22 along the circumference. For example, it can comprise a sealing adhesive tape and/or a lacquer and/or an edge-enclosing component.

The rotation unit 10 is connected, coaxially with respect to its cylinder axis 11, to a shaft 12 so it is rotationally fixed. For this purpose, the cylinder bottom 32 of the hollow cylinder 20 of the rotation unit 10 is fixed on the shaft, for example, by means of a press fit 34 or gluing. However, other known detachable connections to the shaft are also conceivable, for example, screw connections, which would permit easier replacement of the rotation unit in the event of a defect, for example, but possibly have worse operating properties with respect to play in exchange. The shaft 12 is driven by a motor (not shown in FIG. 3a) which is mounted in a motor housing 14. A shaft bearing 18, in which the shaft 12 is rotatably mounted, is provided in a motor housing part 16 of the motor housing 14 facing toward the rotation unit 10.

To be able to determine the angle position of the rotation unit 10 and therefore of the rotation mirror 22, components of an angle encoder (not shown) are arranged in a known manner on the cylinder bottom or the housing part 16 of the motor housing 14.

A gap 40 is typically provided between the cylinder bottom 32 and the motor housing 14, for which a gap cover is not provided, to enable frictionless rotation of the rotation unit 10 in relation to the motor housing 14. A passage opening 42 is provided in the cylinder bottom 32 of the hollow cylinder 20, which is provided with an air-permeable membrane 44 to enable an air exchange between the cavity 46 and the gap 40. The passage opening 42 enables a compensation if pressure differences occur between cavity 46 and environment, which can occur, for example, as a result of high rotational velocities or during transport of the device from low-lying locations into high locations, for example, in the mountains, or simply because of air pressure variations. The air flow is not obstructed by the membrane 44, while a transfer of dirt or moisture is prevented or at least reduced.

According to the embodiment shown in FIG. 3a, the rotation unit 10 is provided with at least one balance element 36, which is housed in the cavity 46, and specifically preferably in the region of the cylinder bottom 32. An attachment of balance elements outside the hollow cylinder is also conceivable, of course, for example, externally on the cylinder wall or externally on the cylinder bottom (not shown). Recesses for accommodating balance elements can be provided for this purpose in the cylinder bottom. A balance element 36 preferably comprises a material which has a higher specific weight than that of the rotation body 20, and specifically brass in particular. In the example shown in FIG. 3a, two balance elements 36 of different size and geometry are each connected via a connection element 38, for example, implemented to fulfill a plug-in functionality, to the cylinder bottom 32. Of course, however, these could just as well be fastened on the cylinder wall, preferably close to the cylinder bottom.

As is apparent from FIG. 3a, the balance elements 36 in this rotation unit are introduced and installed from the free end of the hollow cylinder 20 into the hollow cylinder 20 before the installation of the rotation mirror 22. According to another embodiment (not shown here), multiple through openings are provided in the cylinder bottom, via which the installation of balance elements 36 in the cavity 46 of the hollow cylinder 20 can be performed. These passage openings are preferably closable using a membrane and openable again, wherein the membrane is air-permeable, but keeps dirt, dust, and moisture out of the cavity 46. Because the openings are closed using the membranes in a manner allowing them to be opened, readjustment remains possible.

Additionally or alternatively to the balance elements 36, sinkholes 37 in the cylinder bottom 32 can assist the dynamic balancing. These sinkholes 37 can also be introduced subsequently, i.e., after the installation, for subsequent fine balancing. Material is removed by the sinkholes to compensate for an established imbalance. The position of the sinkhole and the amount of the material to be removed are precisely determined before the material removal based on the measured imbalance.

Except for the balance elements 36, the interior between rotation mirror 22, cylinder wall 30, and cylinder bottom 32 of the rotation body 20 is empty, whereby the weight of the rotation unit is very low. The moment of an area orthogonal to the axis is large, however, which causes a high stiffness in spite of the low mass.

Preferably, as also shown in the example of FIGS. 3a, 3b, the rotation mirror 22 is fastened on the free end of the cylinder wall 30 by an adhesive bond 24. However, other fastening possibilities are also conceivable, for example, using individual fastening clamps distributed around the circumference or a frame-type fastening ring, which encloses rotation mirror 22 and cylinder wall 30 on the end side along the circumference. In the example shown here, the adhesive bond 24 is embodied continuously along the circumference.

FIG. 3b shows a frontal view of the rotation body of the rotation unit from FIG. 3a without rotation mirror, i.e., perpendicularly to the cylinder axis 11.

The shaft 12 is located in the center, installed in the associated press fit 34. Concentrically around this, successively from the inside to the outside, the end side of the cylinder wall 30 having the region of the adhesive bond 24 in its center, the gap seal 28, and finally the motor housing 16 are visible. According to this example, the adhesive bond 24 is implemented continuously along the entire circumference of the cylinder wall 30. Because of this continuous adhesive bond, it would be possible, depending on the adhesive used, to leave out the gap seal 28 if the adhesive already ensures a seal which is sufficiently secure against moisture and dirt.

A geometrical division of the geometric cross section of the cylinder wall 30 into four quadrants is indicated by dashed lines. Adjoining the cylinder wall 30, in the upper cross-sectional half, symmetrically divided on the two upper quadrants, a first balance element 36, which is shaped elliptically in cross section solely as an example, is arranged. Opposite thereto, also adjoining the cylinder wall 30 in the lower cross-sectional half, symmetrically divided on the two lower quadrants, a second balance element 36' is arranged, which has a circular cross section, for example, and is implemented as smaller than the first balance element 36. As described above, in addition to the balance elements 36, 36', in this example there are sinkholes 37, which are preferably applied in the two upper quadrants (not recognizable in FIG. 3b). In addition, the passage opening 42 having the membrane 44 located therein is shown in the right lower quadrant (at the rear end of the rotation unit 10).

Figure 4A:
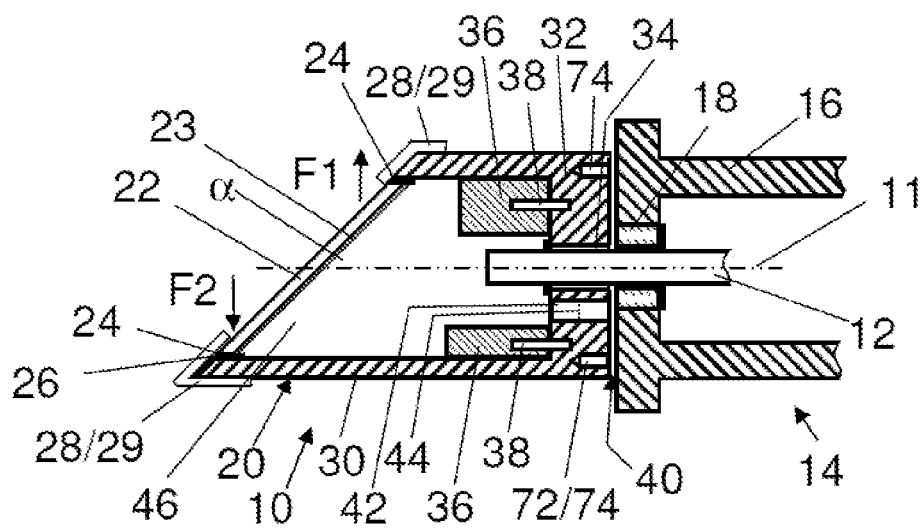
FIG. 4a shows, in a similar illustration to FIG. 3a, a second embodiment of a rotation unit according to the invention of the surveying device according to the invention.
Figure 4B:
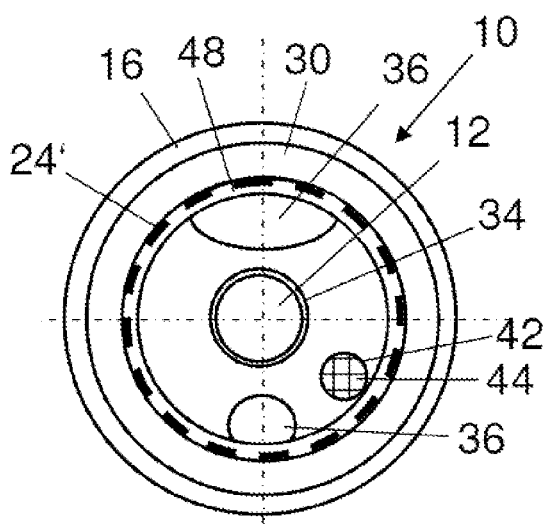

FIGS. 4a and 4b show, in a similar type of illustration to FIGS. 3a, 3b, a sectional view and frontal view of a second embodiment of a rotation unit 10 of the surveying device according to the invention. The embodiment shown here differs from that shown in FIGS. 3a, 3b in that the rotation mirror 22 is fastened in this embodiment at the free end of the hollow cylinder 20 on the radial inside on the cylinder wall 30. The adhesive bond selected for this purpose consists of discrete adhesive points 24', which are arranged distributed uniformly around the circumference and in this example are embodied as lamellar adhesive strips 24' extending in the peripheral direction, between which a specific distance exists. This is advantageous for a stress compensation in the mirror 22.

In addition the rotation unit 10, differently from the embodiment according to FIGS. 3a, 3b, has an additional safety precaution in the form of an enclosing component 29, to prevent the rotation mirror 22 from flying off during its rotation. The component 29, which encloses an edge region of the outer side and also the end side of the cylinder wall 30 and a peripheral region of the rotation mirror 22 along the circumference in this exemplary embodiment, is used here at the same time as the gap seal 28.

Due to the beveling at the free end, the cylinder wall 30 is provided with a first half, which is the upper half in FIGS. 3a, 4a, 3b, 4b, in which the cylinder wall 30 has a shorter length viewed from the cylinder bottom 32, and a second half, which is the lower half in FIGS. 3a, 4a, 3b, 4b, in which the cylinder wall has a greater length, wherein the length of the cylinder wall 30 increases from a shortest point to a longest point along the circumference at a constant slope.

Because of the beveled shape of the cylinder wall 30 having the rotation mirror 22 installed at an angle $\alpha$, preferably of 45°, to the cylinder axis 11, in operation of the surveying device 1, different forces F1, F2 acting in the opposite direction result (cf. FIGS. 3a, 4a), which act on the rotation mirror 22, wherein the strength of these forces increases with the rotational speed of the rotation unit 20.

During the rotation about the cylinder axis 11, in particular at high rotational velocities, centrifugal forces F1, F2 act on the rotation mirror, which are oriented radially outward and, in the region of the shorter half of the hollow cylinder 20, which is the upper half in FIG. 4a, have the tendency to drive the rotation mirror 22 away from the free end of the rotation body 20 (F1), or to detach the rotation mirror from the free end of the cylinder wall 30. In the region of the opposing longer half, which is the lower half in FIG. 4a, the centrifugal force F2 acts with an opposite tendency, namely to press the rotation mirror 22 against the free end of the cylinder wall 30.

Because of this opposing action of the centrifugal forces F1, F2, which act on the rotation mirror 22 and are oriented radially outward, it is advantageous to use multiple different adhesive bonds or adhesives having different properties for the adhesive bond 24 of the rotation mirror 22 on the free end of the cylinder wall 30. In particular, the use of a first, harder adhesive bond or a first, harder adhesive for gluing the rotation mirror 22 on the free end of the cylinder wall 30 advantageously opposes a detachment of the rotation mirror 30 in the region of the shorter (upper) half. The use of a second, more elastic adhesive bond or a second, more elastic adhesive in the region of the second, longer (lower) half has a compensatory and springy effect with respect to the forces F2, which act on this side and press the rotation mirror 22 against the free end of the cylinder wall 30 here. Overall, the stresses in the mirror 22 can be reduced by this measure and the risk of detaching of the mirror 22 can be substantially decreased. It is to be noted here that the hardness or elasticity of an adhesive bond can be influenced not only by the selection of the adhesive, but rather also, for example, by the adhesive gap thickness and the geometric embodiment or size/area extent of the adhesive points.

The use of two adhesives having different elasticity in this example also has positive effects in regard to the interfering influence of temperature variations of the ambient temperature. Because of the different coefficients of expansion between rotation mirror, which is preferably manufactured from glass, and cylinder wall 30 made of light metal or plastic, stresses arise at extreme temperatures, which disadvantageously influence the flatness of the mirror. These stresses can be absorbed by adhesives of different hardness, so that the mirror has fewer or no stresses.

To increase the operational safety, in addition to the use of different adhesives, additionally or alternatively a safety element 29 can be provided. The safety element 29 holds back the mirror 22 in the region of the rotation unit 10 in the event of a detachment from the cylinder wall 30. Additionally or alternatively thereto, a breakage protection can be provided, for example, in the form of a coating 23 or safety film applied to the rear side of the rotation mirror 22 or in the form of the use of safety glass.

Figure 4C:
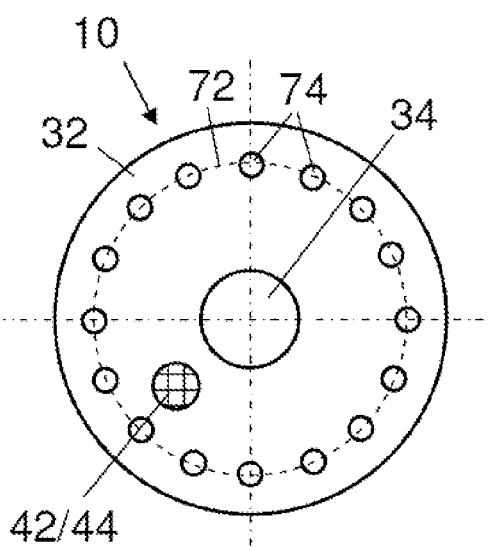
FIG. 4c schematically shows the rotation unit from FIG. 4a in the view of the cylinder bottom.

Although the rotation body 20 is fundamentally already statically and dynamically balanced without a balance circle because of the embodiment according to the invention, tolerance errors can result in small imbalances, which can have a negative effect in the long term. Such imbalances can be remedied very easily if a balance circle 72 is provided. Such a balance circle 72 is provided in the cylinder bottom 32 of the example shown in FIGS. 4a to 4c and comprises individual threaded boreholes 74, which are distributed concentrically and uniformly about the cylinder axis 11. For fine balancing, grub screws (not shown) of different mass, in particular of different length and/or having different specific weight, can be screwed into the threaded boreholes. This measure not only enables the balancing during the installation, but rather also subsequent balancing.

Figure 5A:
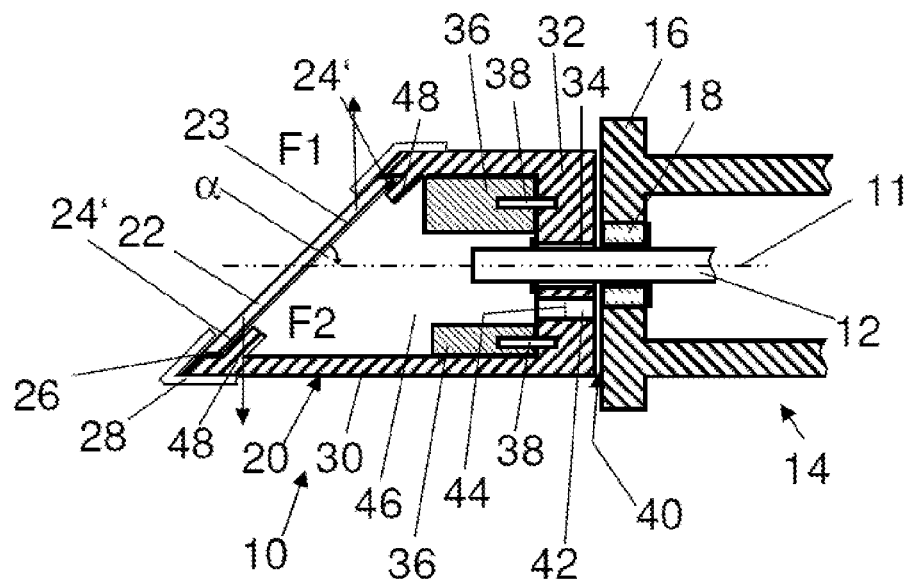
FIG. 5a shows, in a similar illustration to FIG. 3a, a further embodiment of a rotation unit according to the invention of the surveying device.
Figure 5B:
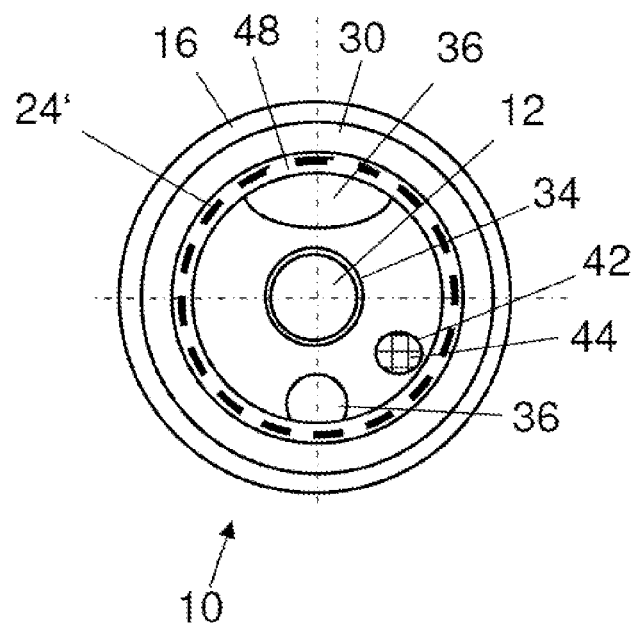

FIGS. 5a and 5b show, in a similar type of illustration to FIGS. 3a, 3b, a sectional view and frontal view of a further embodiment, which is slightly altered in relation to the embodiment from FIGS. 4a, 4b, of a rotation unit 10 of the surveying device according to the invention. In this example, a stainless steel plate having a thermal expansion of approximately 10 ppm/K is provided as a breakage safety element 23, which is attached to the rear side of the mirror 22. The mirror is preferably glued to the steel plate and thus forms a fixed unit with it. The rotation mirror 22 is again inserted into the free end of the hollow cylinder 20 instead of being placed on the end faces of the cylinder wall 30 (embodiment from FIGS. 3a, 3b). In contrast to the embodiment according to FIGS. 4a, 4b, this embodiment also has additional shoulder elements 48, however, which protrude radially inward from the cylinder wall 30 in the region of the free end, at the same angle of inclination α which the bevel of the cylinder wall 30 has. In this case, the shoulder elements 48 are offset axially inward into the cavity 46, and preferably by a distance which approximately corresponds to the thickness of the rotation mirror 22 with its breakage protection 23, so that it terminates flush with the cylinder wall after the installation. If the mirror 22 is in turn fastened on the radial inside on the cylinder wall 30, the rotation mirror 22 can be supported in its peripheral regions along its circumference against the shoulder elements 48 during the installation. The alignment of the rotation mirror 22 during its installation is thus made easier. In the example shown here, the rotation mirror is again connected by an adhesive bond 24 to the cylinder wall 30, wherein, however, discrete, lamellar adhesive points 24' of the adhesive bond are arranged this time on the shoulder elements 48 of the cylinder wall 30, so that the shoulder elements 48 are not only used for easier installation, but rather assume a supporting and above all force-absorbing function, in particular with respect to the force F2 acting axially on the cylinder wall 30 in the region of the longer cylinder wall 30 during the rotation. A gap seal 28 is again provided.

In the example shown here, the shoulder element 48 is implemented as a continuous element extending on the radial inside on the cylinder wall 30 along the circumference of the cylinder wall 30. However, it is also conceivable to implement it in the form of a plurality of discrete shoulder elements 48, which are preferably distributed at uniform intervals to one another along the circumference of the cylinder wall 30. In the example shown here, cylinder wall 30 including shoulder element 48 and cylinder bottom 32 are manufactured in one piece, for example, from aluminum casting.

Figure 6A:
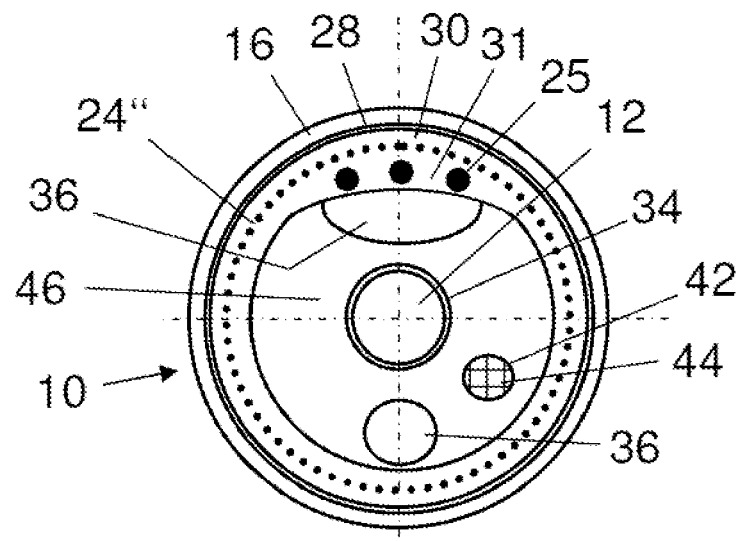
FIGS. 6a, 6b show, in a similar illustration to FIG. 3b, two further embodiments of the rotation unit according to the invention of the surveying device according to the invention.

FIG. 6a shows, in a similar illustration to FIG. 3b, a further embodiment of the rotation unit 10 of the surveying device according to the invention. This differs from the embodiment according to FIGS. 3a, 3b in that a continuous adhesive bond 24 is not implemented on the end side on the cylinder wall 30, but rather a plurality of discrete adhesive points 24" are arranged at uniform intervals to one another along the circumference of the cylinder wall 30. According to this example, the discrete adhesive points 24" are implemented in the form of spots or circles and are distributed uniformly, spaced apart from one another along the circumference. In addition, the cylinder wall 30 has on its free end in its shorter half (the upper half here), in its shortest region, a flange 31, which extends laterally symmetrically from the middle in both directions and slightly radially inward into the cavity 46 from the cylinder wall 30. This flange is used for the purpose of accommodating one or more—in this example three—further adhesive points 25, to protect the mirror 22 still better before lifting off or a deformation as a result of the centrifugal force F1 acting away from the cylinder wall 30.

Figure 6B:
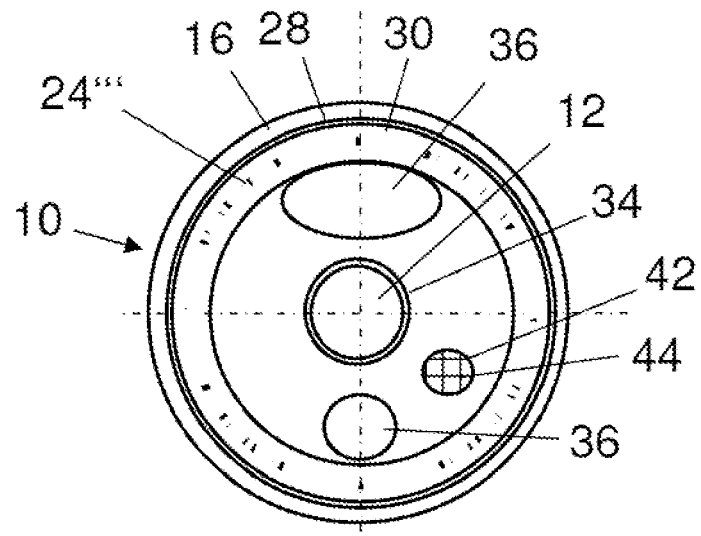

FIG. 6b shows, in equivalent illustration, a further embodiment of the rotation unit 10 of the surveying device according to the invention. In contrast to the arrangement of discrete adhesive points according to FIG. 6a, the discrete adhesive points 24" are implemented in the form of square adhesive pads 24'''. In addition, they are not arranged at uniform mutual intervals along the circumference of the cylinder wall 30, but rather are arranged in groups of adhesive points 24''' distributed uniformly on the four quadrants, wherein in this case the intervals between the groups and between the adhesive points 24''' within the individual groups are uniform. Therefore, the adhesive pads 24''' are arranged point-symmetrically opposite to one another in relation to the cross-sectional center.

Such an arrangement, like the above described adhesive bonds having differently embodied discrete adhesive points 24', 24", is outstandingly suitable for the use of various adhesives having different properties, as is described, for example, for the exemplary embodiment 4a, 4b, i.e., using a first, harder adhesive in the region of the first half shown on the top in each case having the shorter cylinder wall, and in each case a second, more elastic adhesive in the second half, which is shown on the bottom in each case, having the longer cylinder wall. If necessary, further adhesives having appropriately adapted adhesive properties can also be used inside the halves for fine tuning to the occurring force conditions. The force conditions can be calculated beforehand in this case by finite element method. The surface extension, the intervals between the adhesive points and the general arrangement thereof and also the thickness thereof can also be adapted in very great detail and optimized via the finite element method.

Depending on how the rotation mirror 22 is fastened on the cylinder wall, a gap 26 which is more or less permeable to dust and moisture is located between the rotation mirror 22 and the cylinder wall 30 supporting it. As shown in FIGS. 3a, 3b, this gap 26 is advantageously sealed using a gap seal 28. Penetration of dust and/or dirt and/or moisture can thus be prevented. The gap seal 28 is preferably applied externally and encloses the edge of the cylinder wall 30 and the peripheral edge of the mirror 22 along the circumference. For example, it can comprise a sealing adhesive tape and/or a lacquer and/or an edge-enclosing component.

If the rotation mirror is manufactured from a mirrored metal plate, its geometry and hardness can also be optimized with respect to the interaction with the adhesive points. The finite element method can advantageously also be used here.

Figure 7:
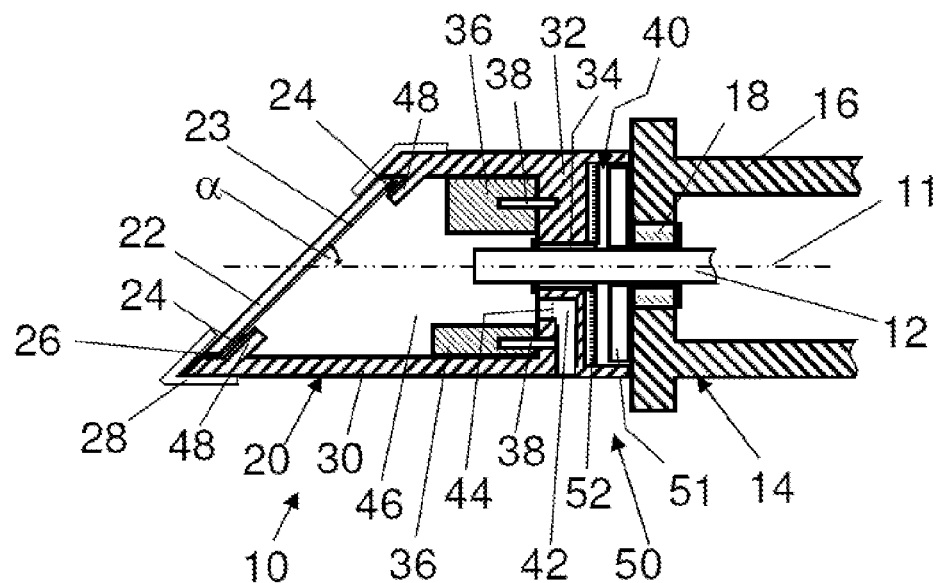
FIG. 7 shows, in a similar illustration to FIG. 3a, a further embodiment of a rotation unit according to the invention.

The exemplary embodiment of FIG. 7 essentially corresponds to the exemplary embodiment from FIG. 5a, except that an angle encoder 50 is arranged in the gap 40 between the motor housing and the rotation unit 10. Sensors 51 of the angle encoder 50 are arranged on that side of the motor housing 14 facing toward the rotation unit 10, while an encoder disk 52 having coding is arranged on the side of the cylinder bottom 32 facing toward the motor housing 14, so that it corotates with the rotation unit 10. The angle encoder 50 shown here is an optical angle encoder. However, the use of a capacitive or magnetic angle encoder is also conceivable. This embodiment has the advantage that in the event of an axial deformation or bending of the shaft, for example, because of an imbalance, the angle encoder can establish a radial and/or axial offset, which can be taken into consideration during the analysis of the obtained measurement results and thus leads to more precise results, or it can lead to a warning message in the event of an excessively large offset. In addition, in this embodiment, cylinder bottom 32 and motor housing 14 are used simply and efficiently as an installation platform for the components, sensors 51 and encoder disk 52, of the angle encoder 50, so that installation time and space requirement are reduced.

Figure 8:
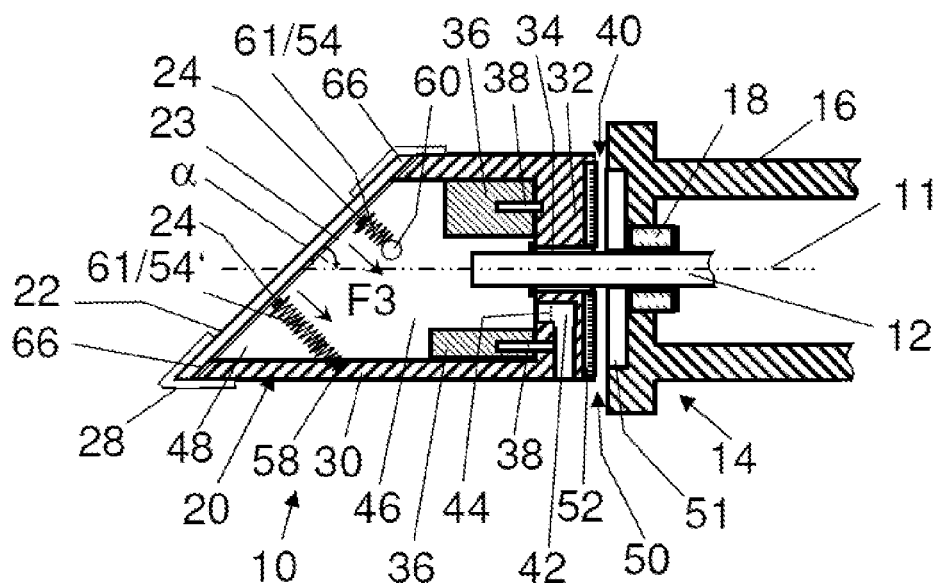
FIG. 8 also shows, in a similar illustration to FIG. 3a, still a further embodiment of a rotation unit according to the invention.

As shown in FIG. 8, the sensors 51 and the encoder disk 52 of the angle encoder 50 can also be fitted into recesses provided for this purpose in the cylinder bottom 32 and the side of the motor housing facing toward the cylinder bottom 32, which further reduces the required installation space.

As can be seen in FIGS. 7 and 8, the placement of the angle encoder 50 in the gap 40 between motor housing 14 and rotation unit 10 and in particular the arrangement of the encoder disk 52 or the sensors 51 in or on the cylinder bottom 32 of the rotation unit does not permit a continuous passage opening 42 linearly from the cavity 46 into the gap 40 for the pressure compensation. It is apparent that a passage opening 42 can also be provided in the cylinder bottom 32 or also in the cylinder wall 30, which connects the cavity 46 of the hollow cylinder 20 to another air-accessible outer side of the hollow cylinder 20 instead of to the gap 40, as shown in FIGS. 7 and 8. This passage opening 42 is also advantageously provided with an air-permeable membrane 44, which is impermeable to moisture, dust, and dirt.

The embodiment of the rotation unit 10 shown in FIG. 8 essentially corresponds, except for the angle encoder 50, to that from FIGS. 3a, 3b. However, in this exemplary embodiment, the rotation mirror 22 is connected by means of spring elements 53 to the cylinder wall 30. The spring elements 53 are implemented in this example as coiled springs 54, 54', which are connected by an adhesive bond 24 to the rotation mirror 22. While the coiled spring 54' shown on the bottom in FIG. 8 is anchored by means of a clamp connection 58 in the cylinder wall 30, for example, the coiled spring 54 shown on top in FIG. 8 is fixedly connected to the cylinder wall 30 by means of a holding pin 60 anchored in the cylinder wall 30, for example. The coiled springs 54, 54' draw the rotation mirror 22 with a traction force F3 toward the interior 46 of the rotation body 20, which is embodied as a hollow cylinder, and therefore toward the beveled end-side edge of the cylinder wall 30, which is therefore used as a support surface 66 for the mirror 22.

Figure 9A:
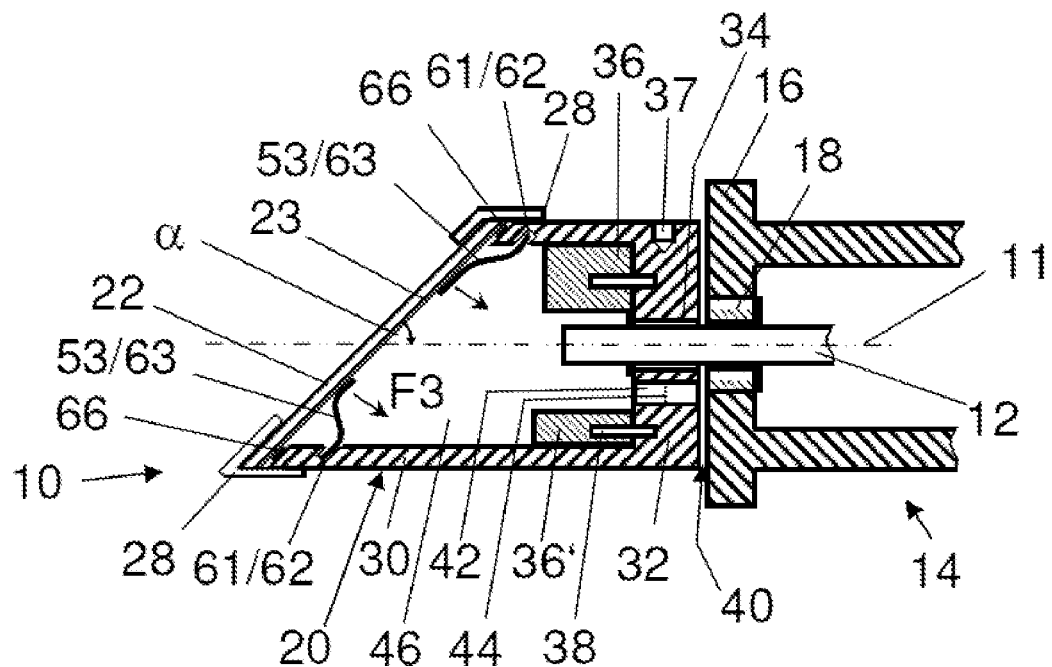
FIGS. 9a, 9b show, in a similar illustration to FIGS. 3a and 3b, a further embodiment of a rotation unit according to the invention.
Figure 9B:
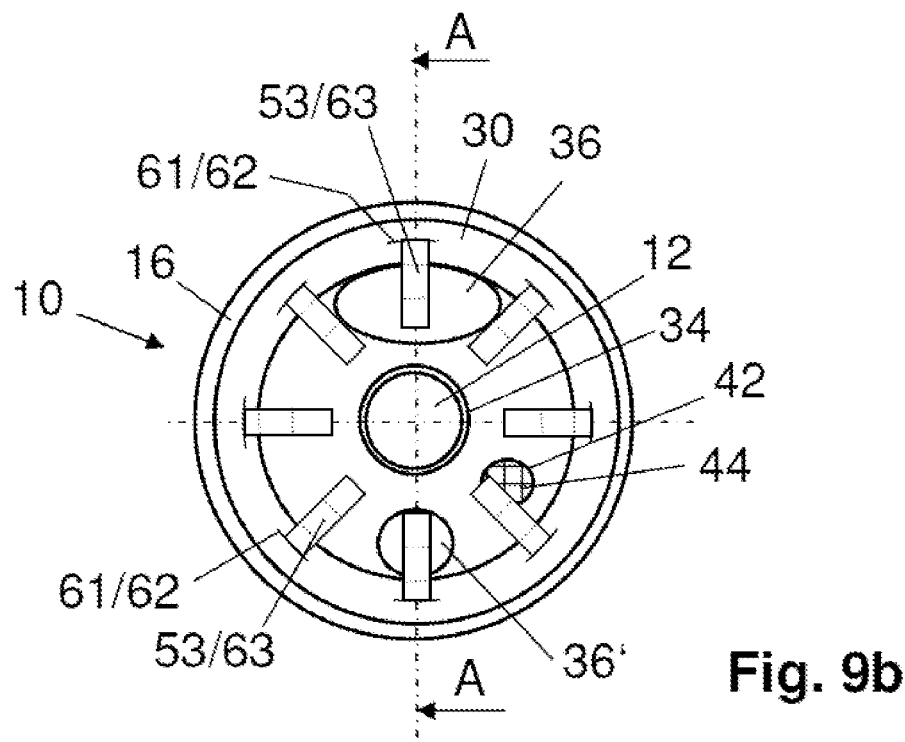

FIGS. 9a, 9b illustrate a rotation unit 10 according to the invention, as is also essentially already known from FIGS. 3a and 3b. However, in this embodiment the adhesive bond 24 is also replaced by multiple spring elements 53. The spring elements 53 are implemented in this example as spring plate tongues 63, which extend from the cylinder wall 30 into the cavity 46 of the cylinder 20 and toward the rotation mirror 22. The spring plate tongues 63 are anchored by means of clamping mechanism 61 in the cylinder wall 30. The clamping mechanism 61 comprises in particular fastening slots 62, which are accessible from the cavity 46 of the cylinder 20, and in which the spring plate tongues 63 can be clamped. The spring plate tongues 63 are bent such that they are under pre-tension in the installed state and draw the rotation mirror 22, which is fixedly glued on their free ends, with a traction force F3 toward the beveled end side of the cylinder wall 30 as the support surface 66. Instead of the adhesive bond between the spring plate tongues 63 and the rotation mirror 22, a clamp connection is also conceivable. For the clamp connection, the rotation mirror can be provided with corresponding clamp or snap elements, for example, into which the spring plate tongues can be clamped/snapped (not shown). All further elements of this exemplary embodiment are known from one of the preceding figures, are mentioned with the same reference signs as therein, and are described therein.

Figure 10A:
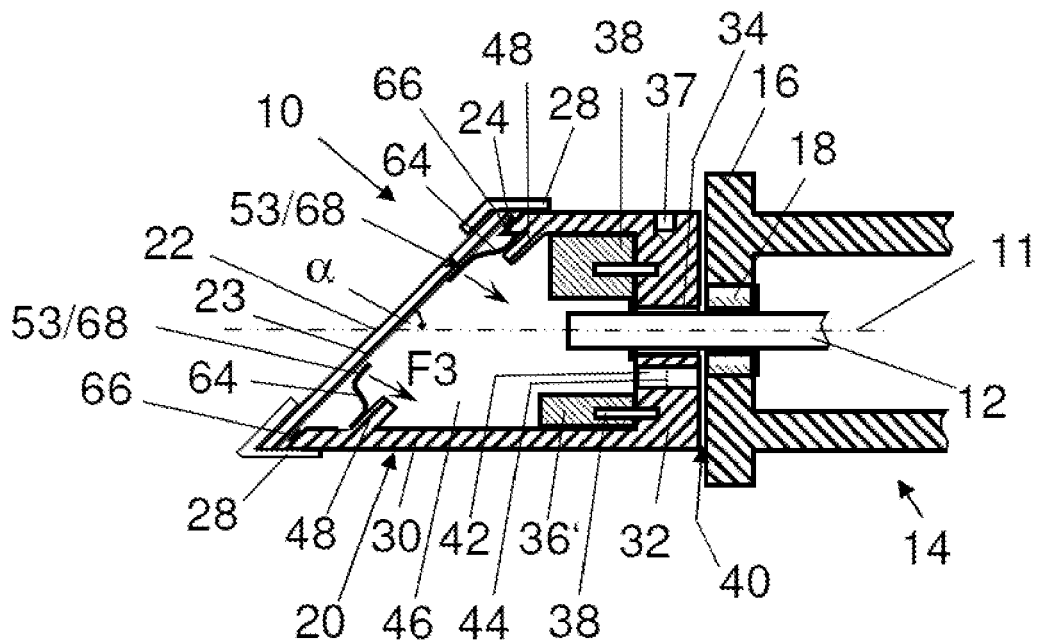
FIGS. 10a, 10b also show, in a similar illustration to FIGS. 3a and 3b, still a further embodiment of a rotation unit according to the invention.
Figure 10B:
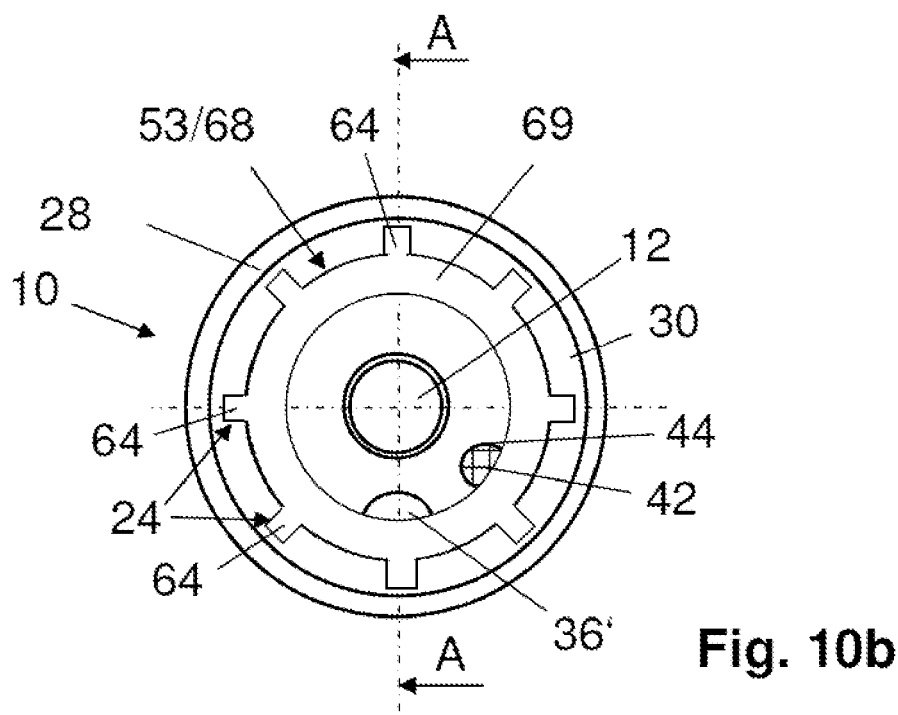

FIGS. 10a and 10b show a variant of the embodiment from FIGS. 9a, 9b. In contrast to the embodiment of FIGS. 9a, 9b, only one spring element 53 is provided here. This one spring element 53 is embodied in the form of a ring-shaped spring plate 68 having ring 69 and connection elements 64 protruding radially outward from the ring 69. The ring 69 is adapted in its geometry to the ellipsoid opening of the beveled end of the rotation body 20, which is implemented as a hollow cylinder, and is used for the fixed connection to the rotation mirror 22. This fixed connection can be produced by means of a clamp connection or preferably by means of an adhesive bond. For a clamp connection, the rotation mirror can be provided, for example, with corresponding clamp or snap elements, into which the ring can be clamped/snapped (not shown), or, vice versa, the rotation mirror can be clamped/snapped into corresponding clamp or snap elements of the spring element 53 (not shown). In the example shown here, the connection elements 64 are glued onto a shoulder 48 of the cylinder wall 30, as was already described for FIG. 5a. The spring element 53 is again pre-tensioned in the installed state so that it draws the rotation mirror 22 toward the end side of the cylinder wall 30, which is then used as the support surface 66.

Figure 11A:
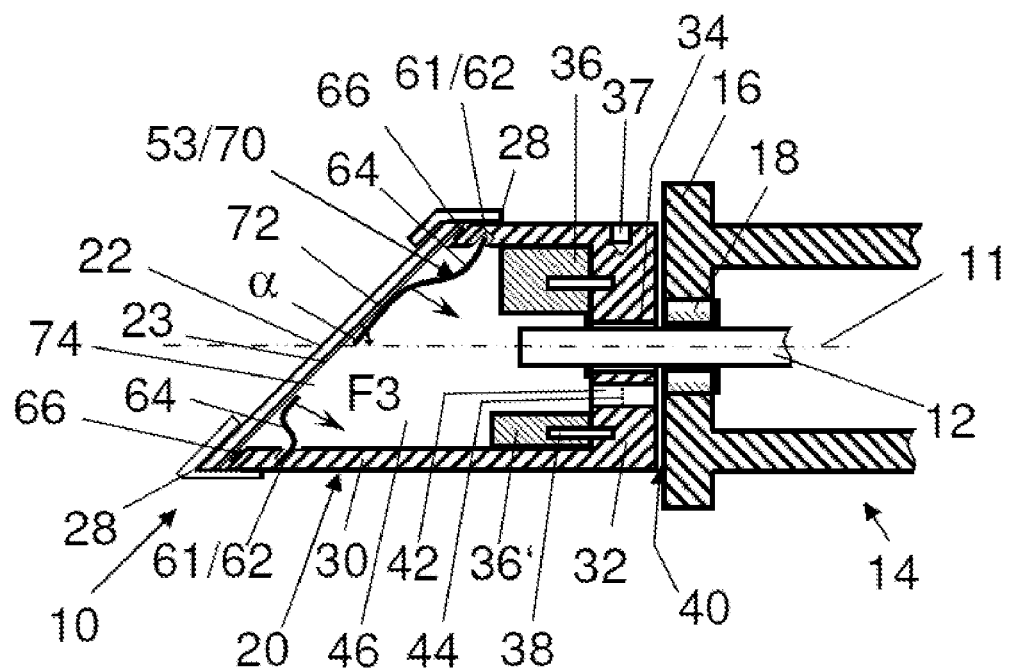
FIGS. 11a, 11b also show, in a similar illustration to FIGS. 3a and 3b, still a further embodiment of a rotation unit according to the invention.
Figure 11B:
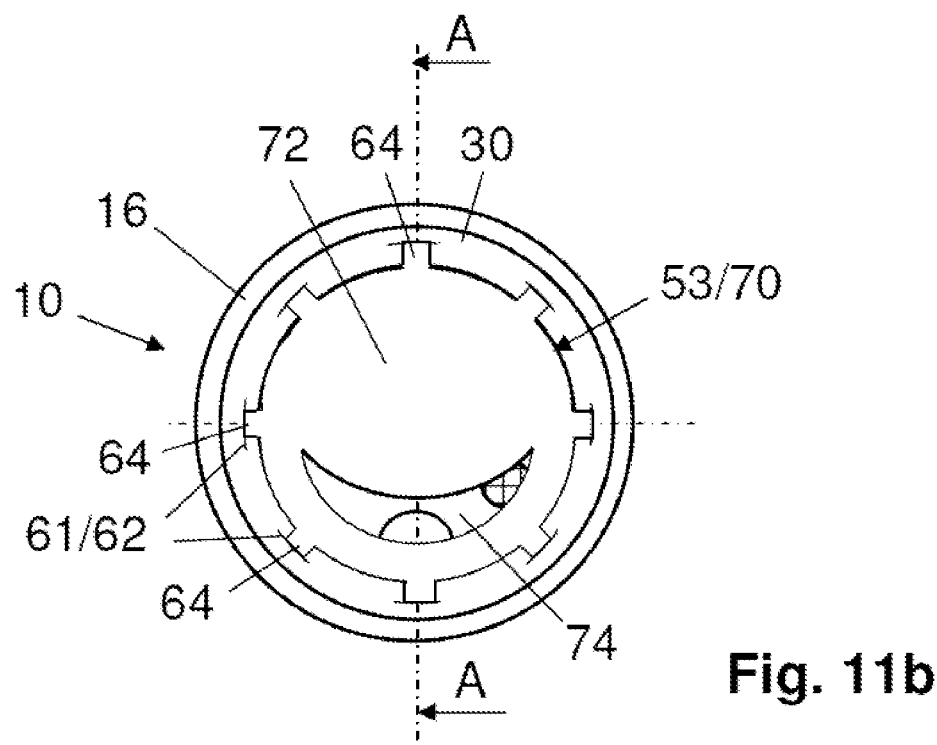

Still a further variant of the rotation unit 10 according to the invention is shown in FIGS. 11a, 11b, which is essentially based on the embodiment as shown in FIGS. 9a, 9b. However, in contrast to this embodiment, in the example shown here there is again only one single spring element 53 manufactured in one piece, which is implemented as a planar spring plate element 70. The planar spring plate element 70 has a surface 72, which is adapted in its geometry to the ellipsoid opening of the beveled end of the rotation body 20, which is implemented as a hollow cylinder. It is used for the fixed connection to the rotation mirror by means of adhesive bond or clamp connection, wherein correspondingly interlocking clamp elements (not shown) are provided on the surface 72 and on the rotation mirror 22 for the clamp connection. The surface 72 can be provided with one or more recesses 74 as needed, to avoid imbalance and save weight. Connection elements 64 protrude radially outward from the surface 72, as were already described in conjunction with the ring-shaped spring plate 68 from FIGS. 10a, 10b. Instead of being glued to a part of the cylinder wall 30, the connection elements 64 are again anchored in this example, however, in fastening slots 62 of the cylinder wall in a type of clamping mechanism 61. This spring element 53 is also pre-tensioned in the installed state so that it draws the rotation mirror 22 with its peripheral region toward the end side of the cylinder wall 30, which is then used as the support surface 66.

Constructions are also conceivable in which the rotation mirror 22 is drawn with its peripheral region toward a shoulder 48, as described above, so that the shoulder 48 of the cylinder wall 30 is used as the support surface 66 (not shown).

As is apparent from FIGS. 9b, 10b, 11b, the spring elements 53, independent of their respective embodiment as coiled springs 54, 54', as spring plate tongues 63, as a ring-shaped spring plate 68, or as a planar spring plate element 70, are preferably fastened in or on the cylinder wall 30 distributed over their circumference or the circumference of the cylinder wall 30, and in particular distributed uniformly over the respective circumference.

It is apparent that although here only rotation bodies implemented as hollow cylinders having spring elements 53 are shown, rotation bodies 22 which are manufactured in the form of light construction structures or in solid construction can also be provided with such spring elements 53, as are described as examples above. The spring elements 53 are then either fastened by adhesive bonds or clamp connections to the beveled end face of the rotation body 22 or to parts thereof (light construction structure) or are however fastened on the outer side of the cylinder wall 30 in the end region.

The support surface 66 for supporting the rotation mirror 22, as is shown, for example, in the embodiments of FIGS. 7 to 11a, is optionally provided with one or more damping elements (not shown), which are made, for example, of felt or foam rubber or similar material, and protect the rotation mirror 22 in the event of shock or impact stresses of the surveying device. The rotation mirror 22 can optionally also be glued in each case to the support surface 66, so that the rotation mirror 22 is fixedly connected to the cylinder wall both by means of an adhesive bond, as was described above as an example for FIGS. 3a to 6b, and by means of one or more spring elements 53, as were described for FIGS. 7 to 11b.

In summary, it is once again to be emphasized that the surveying device according to the invention is distinguished in particular by compact construction and an ideal relationship between stiffness and weight of its rotation unit. The details which are described and illustrated in the figures may be combined with one another in further variants, which are not explained in detail here for reasons of space, wherein it is clear to a person skilled in the art which combinations are reasonable.

What is claimed is:

1. A rotation unit for a surveying device for optically scanning an environment, wherein the rotation unit comprises:
    a rotation body implemented as a cylinder having a beveled, free end, which is provided to be rotatably mounted in the surveying device about its cylinder axis; and
    a rotation mirror disposed on the beveled, free end of the rotation body, and arranged inclined in relation to the cylinder axis is provided for deflecting an emission light beam and a reception light beam;
    wherein the rotation body is implemented as a hollow cylinder having a cavity delimited by a cylinder bottom and a cylinder wall protruding therefrom, which is beveled on its free end opposite to the cylinder bottom, and by the rotation mirror fastened in the region of the free end on the cylinder wall, and
    wherein the hollow cylinder is connectable, coaxially with respect to its cylinder axis, in a rotationally-fixed manner to a motor-driven shaft of the surveying device via its cylinder bottom.

2. The rotation unit according to claim 1, wherein the rotation mirror is fastened on the end side on the cylinder wall.

3. The rotation unit according to claim 1, wherein the rotation mirror is fastened on the radial inside on the cylinder wall.

4. The rotation unit according to claim 1, wherein the cylinder wall, adjacent to the free end, has at least one shoulder element on the radial inside, against which the rotation mirror is supportable in a peripheral region along its circumference.

5. The rotation unit according to claim 1, wherein the rotation mirror is fastened by an adhesive bond in the region of the free end on the cylinder wall, wherein the adhesive bond is set in its hardness or elasticity by the geometry of the adhesive bond,
    Wherein the hollow cylinder has a cylinder wall of shorter length in the region of its free end because of its bevel in the region of a first half and has a cylinder wall of greater length in the region of a second half opposite to the first half, and the rotation mirror is fastened in the region of the first shorter half of the cylinder wall by means of a first adhesive bond, which is harder than a second adhesive bond, to the cylinder wall and is fastened in the region of the second longer half by means of a second adhesive bond, which is more elastic than the first adhesive bond.

6. The rotation unit according to claim 1, wherein the rotation mirror is fastened with the aid of one or more spring elements on the rotation body or on the cylinder wall of the rotation body, wherein the spring element or elements is/are fastened in or on the cylinder wall in the region of the free end of the hollow cylinder distributed over the circumference of the cylinder wall.

7. The rotation unit according to claim 1, wherein the spring element or elements is/are fastened in or on the cylinder wall in the region of the free end of the hollow cylinder uniformly distributed over the circumference of the cylinder wall.

8. The rotation unit according to claim 7, wherein the rotation mirror is drawn by means of the spring element or elements with its peripheral region toward a part of the cylinder wall, which is then used as the support surface for the rotation mirror.

9. The rotation unit according to claim 7, wherein the spring element or elements are connected at least at spots to the rotation mirror by an adhesive bond and the adhesive bond is implemented.

10. The rotation unit according to claim 1, wherein cylinder bottom and cylinder wall are implemented in one piece from plastic, aluminum, or an aluminum alloy.

11. The rotation unit according to claim 1, wherein the rotation mirror is manufactured from mirror-coated glass and has a thickness of 0.5 mm to 3 mm, and is provided with a breakage protection, which comprises a coating or safety film applied to the rear side of the rotation mirror or a metal plate having a coefficient of thermal expansion similar to that of the rotation mirror.

12. The rotation unit according to claim 1, wherein a safety precaution is provided, which holds back the rotation mirror in the region of the hollow cylinder in the event of failure of the fastening, wherein the safety precaution comprises a safety element, which encloses the cylinder wall on the radial outside, the rotation mirror, and/or its breakage protection on the end side along the circumference of the cylinder wall.

13. The rotation unit according to claim 1, wherein a gap is provided between the rotation mirror and the free end of the cylinder wall, and this gap is provided with a gap seal, wherein the gap seal comprises one or more of a sealing adhesive tape, a sealing lacquer, and a sealing component.

14. The rotation unit according to claim 1, wherein the rotation unit is provided with at least one balance element, which is arranged in the cavity of the hollow cylinder, wherein the balance element comprises a material which has a higher specific weight than that from which the hollow cylinder is formed.

15. The rotation unit according to claim 1, wherein the rotation unit is provided in the region of the cylinder bottom therein, wherein the balance element comprises a material which has a higher specific weight than that from which the hollow cylinder is formed.

16. The rotation unit according to claim 1, wherein the balance element comprises brass.

17. The rotation unit according to claim 1, wherein one or more balance circles having openings or threaded boreholes for accommodating mass elements in the form of pins, grub screws, and/or modeling clay are provided for the balancing.

18. The rotation unit according to claim 1, wherein the cylinder wall protrudes beyond the cylinder bottom on its side opposite to the free beveled end and a part of an angle encoder is provided and is fixedly connected to the cylinder bottom in the space thus delimited by the cylinder bottom and the protruding cylinder wall.

19. The rotation unit according to claim 1, wherein the adhesive bond is set by the size and geometric embodiment of the adhesive surface, by the thickness of the adhesive gap, and/or the selection of different adhesives having different properties.

20. A surveying device for optically surveying an environment by scanning emission of an emission measurement beam, the surveying device comprising:
 a radiation source for generating an emission measurement beam;
 a detector, for registering an emission measurement beam reflected on an object in the environment as a reception measurement beam, wherein the emission measurement beam emitted into the environment and the reception measurement beam captured from the environment at least partially have a shared optical path;
 a housing mounted rotatably about a base axis on a base; and
 a rotation unit, which is located in the shared optical path and is mounted rotatably about an axis of rotation in the housing, for the settable, oriented emission of the emission measurement beam into the environment and for the capture of the reception measurement beam from the environment.

* * * * *